United States Patent
Nagai

(10) Patent No.: US 12,306,106 B2
(45) Date of Patent: May 20, 2025

(54) DETECTION DEVICE

(71) Applicant: OTSUKA PHARMACEUTICAL CO., LTD., Tokyo (JP)

(72) Inventor: Fumio Nagai, Tokyo (JP)

(73) Assignee: OTSUKA PHARMACEUTICAL CO., LTD., Tokyo (JP)

(*) Notice: Subject to any disclaimer, the term of this patent is extended or adjusted under 35 U.S.C. 154(b) by 195 days.

(21) Appl. No.: 17/913,357

(22) PCT Filed: Feb. 16, 2021

(86) PCT No.: PCT/JP2021/005651
§ 371 (c)(1),
(2) Date: Sep. 21, 2022

(87) PCT Pub. No.: WO2021/192735
PCT Pub. Date: Sep. 30, 2021

(65) Prior Publication Data
US 2023/0152234 A1    May 18, 2023

(30) Foreign Application Priority Data
Mar. 27, 2020    (JP) .................................. 2020-058608

(51) Int. Cl.
*G01N 21/65* (2006.01)
*G01N 21/64* (2006.01)

(52) U.S. Cl.
CPC ....... *G01N 21/658* (2013.01); *G01N 21/6428* (2013.01); *G01N 2021/6439* (2013.01)

(58) Field of Classification Search
CPC .............. G01N 21/553; G01N 21/648; G01N 33/54373; G01N 2800/52; G01N 33/6893;
(Continued)

(56) References Cited

U.S. PATENT DOCUMENTS 9,012,872 B1    4/2015  Fang et al.
2004/0235177 A1  11/2004  Guedon et al.
(Continued)

FOREIGN PATENT DOCUMENTS

CN    203133094 U  *  8/2013
CN    105486665 A  *  4/2016  ........... G01N 21/553
(Continued)

OTHER PUBLICATIONS

Extended European Search Report issued Feb. 26, 2024 in European Application No. 21774908.4.
(Continued)

*Primary Examiner* — Michael P Stafira
(74) *Attorney, Agent, or Firm* — Sughrue Mion, PLLC

(57) ABSTRACT

The present invention relates to providing a detection device that has high robustness against a temperature change and a temporal change and that is capable of detecting a substance to be detected with high accuracy. The detection device of the present invention is a detection device that detects presence or an amount of a substance to be detected using an enhanced electric field based on surface plasmon resonance, the detection device having a light projecting unit for irradiating a metal film of a detection chip held by a chip holder with excitation light via a prism. The light projecting unit includes: a light source; a diaphragm for regulating an amount of light from the light source; and a conjugate optical system that optically conjugates an opening portion of the diaphragm and a region of the metal film irradiated with the excitation light.

10 Claims, 8 Drawing Sheets

(58) Field of Classification Search
CPC .... G01N 33/74; G01N 21/658; G01N 21/554; G01N 33/54313; G01N 33/57423; G01N 33/57492; G01N 33/54366; G01N 33/53; G01N 21/6428; G01N 33/6872; G01N 33/54393; G01N 33/574; G01N 33/543; G01N 33/68; G01N 33/6854; G01N 21/65; G01N 2021/6439; G01N 33/5438; G01N 33/573; G01N 21/64; G01N 21/05; G01N 21/7703; G01N 33/6863; G01N 21/01; G01N 33/582; G01N 2201/0612; G01N 21/47; G01N 2021/0346; G01N 2333/70596; G01N 2333/71; G01N 2500/04; G01N 21/59; G01N 33/57449; G01N 2201/062; G01N 33/57484; G01N 2015/1493; G01N 21/76; G01N 2800/164; G01N 2201/021; G01N 21/45; G01N 2500/00; G01N 33/54326; G01N 29/022; G01N 33/585; G01N 21/6458; G01N 15/1433; G01N 21/55; G01N 2800/347; G01N 2800/60; G01N 15/1425; G01N 2021/7786; G01N 21/253; G01N 21/552; G01N 33/5008; G01N 33/57415; G01N 2015/1006; G01N 2291/0256; G01N 2333/495; G01N 15/1484; G01N 33/5091; G01N 33/5308; G01N 35/08; G01N 15/1459; G01N 2015/0038; G01N 2800/16; G01N 33/5306; G01N 33/57434; G01N 33/57496; G01N 15/149; G01N 33/6887; G01N 15/14; G01N 2035/00158; G01N 2800/50; G01N 2800/56; G01N 33/54306; G01N 33/54386; G01N 33/76; G01N 1/405; G01N 21/3504; G01N 2291/0423; G01N 2333/475; G01N 2333/59; G01N 2800/202; G01N 21/21; G01N 21/645; G01N 33/57407; G01N 15/1429; G01N 21/31; G01N 21/6452; G01N 2291/0255; G01N 33/5302; G01N 33/554; G01N 2021/6482; G01N 21/03; G01N 2333/70503; G01N 2800/12; G01N 2800/2878; G01N 33/57488; G01N 33/6896; G01N 29/036; G01N 33/48728; G01N 33/553; G01N 33/56983; G01N 33/57446; G01N 33/82; G01N 2291/0426; G01N 2333/525; G01N 29/222; G01N 33/502; G01N 1/28; G01N 1/40; G01N 2021/058; G01N 21/13; G01N 21/4133; G01N 2333/5412; G01N 2333/545; G01N 2500/02; G01N 2800/085; G01N 2800/10; G01N 33/497; G01N 33/56911; G01N 15/0227; G01N 2291/014; G01N 2800/108; G01N 33/569; G01N 33/92; G01N 2021/6471; G01N 2030/009; G01N 2500/10; G01N 1/34; G01N 15/147; G01N 2015/0294; G01N 2015/1497; G01N 2021/6463; G01N 2035/0436; G01N 21/0332; G01N 2333/195; G01N 2333/35; G01N 2333/55; G01N 2333/57; G01N 2400/12; G01N 33/50; G01N 2021/458; G01N 21/66; G01N 21/7743; G01N 33/15; G01N 15/1468; G01N 21/25; G01N 2291/02809; G01N 2333/70578; G01N 2800/2821; G01N 33/5011; G01N 33/5014; G01N 33/54333; G01N 33/5695; G01N 2021/6441; G01N 2021/651; G01N 2030/062; G01N 21/27; G01N 21/41; G01N 21/77; G01N 2291/0427; G01N 2333/005; G01N 2469/20; G01N 27/028; G01N 2800/26; G01N 33/5375; G01N 2021/6419; G01N 2021/6432; G01N 2035/00346; G01N 2035/00356; G01N 2035/0405; G01N 21/17; G01N 21/763; G01N 21/78; G01N 2201/06113; G01N 27/44721; G01N 2800/08; G01N 2800/329; G01N 33/5023; G01N 33/52; G01N 33/686; G01N 35/00732; G01N 35/10; G01N 2021/7776; G01N 2291/02836; G01N 2333/4703; G01N 2333/4709; G01N 27/447; G01N 33/5044; G01N 33/566; G01N 33/6842; G01N 1/2202; G01N 1/44; G01N 2015/0053; G01N 21/00; G01N 21/255; G01N 21/783; G01N 2610/00; G01N 2800/122; G01N 33/0057; G01N 33/54346; G01N 2021/6417; G01N 2333/4716; G01N 27/745; G01N 2800/2885; G01N 33/56966; G01N 35/1095; G01N 11/00; G01N 15/01; G01N 15/10; G01N 2001/2244; G01N 2015/0288; G01N 21/3518; G01N 21/474; G01N 21/4788; G01N 21/6456; G01N 2201/0627; G01N 2201/08; G01N 2291/0257; G01N 2333/72; G01N 2333/916; G01N 2560/00; G01N 30/00; G01N 33/4975; G01N 33/5005; G01N 33/5304; G01N 33/587; G01N 1/14; G01N 2001/247; G01N 2021/5903; G01N 21/39; G01N 21/6402; G01N 21/6408; G01N 2201/0221; G01N 2201/0633; G01N 2201/064; G01N 2333/77; G01N 2333/78; G01N 2333/79; G01N 2400/00; G01N 27/44756; G01N 2800/065; G01N 2800/324; G01N 33/5088; G01N 33/56933; G01N 33/6803; G01N 33/689; G01N 1/22; G01N 1/2247; G01N 15/0205; G01N 15/12; G01N 2001/383; G01N 2021/6421; G01N 2021/7773; G01N 2021/7779; G01N 2035/00881; G01N 21/251; G01N 21/35; G01N 21/4738; G01N 21/6454; G01N 21/774; G01N 2201/068; G01N 2291/02466; G01N 2333/33; G01N 2333/535; G01N 2333/5428; G01N 2333/705; G01N 2333/902; G01N 24/08; G01N 27/4074; G01N 27/44791; G01N 2800/06; G01N 2800/325; G01N 29/348; G01N 29/4418; G01N 30/06; G01N 30/08; G01N 33/0004; G01N 33/0009; G01N 33/0047; G01N 33/4972; G01N 33/558; G01N 35/0098; G01N 1/2208; G01N 13/04; G01N 15/02; G01N 2021/177; G01N 2021/258; G01N 2021/6493; G01N 2035/106; G01N 21/0303; G01N 21/07; G01N 21/274; G01N 21/3581; G01N 21/643; G01N 21/6445; G01N 2201/0231; G01N 2203/0089; G01N 2291/02475; G01N 2333/904; G01N 2333/952; G01N 2333/96455; G01N
27/04; G01N 27/4145; G01N 27/44704;
G01N 27/44782; G01N 2800/245; G01N
2800/32; G01N 2800/54; G01N 29/2437;
G01N 29/2462; G01N 29/346; G01N
33/5058; G01N 33/542; G01N 33/54388;
G01N 33/564; G01N 33/577; G01N
33/6884; G01N 1/2211; G01N 1/4077;
G01N 15/131; G01N 2001/028; G01N
2015/0011; G01N 2015/1028; G01N
2021/399; G01N 2021/7763; G01N
2021/7793; G01N 2030/8827; G01N
2035/00247; G01N 2035/00326; G01N
2035/00544; G01N 21/211; G01N
21/359; G01N 2201/02; G01N
2201/0628; G01N 2201/063; G01N
2201/10; G01N 2291/0215; G01N
2333/165; G01N 2333/4353; G01N
2800/368; G01N 29/02; G01N 30/6091;
G01N 33/00; G01N 33/531; G01N
33/532; G01N 33/60; G01N 33/6845;
G01N 33/6848; G01N 33/9406; G01N
35/00722; G01N 35/085; G01N 35/1009;
G01N 15/1434; G01N 2001/2223; G01N
2015/0026; G01N 2021/213; G01N
2021/3144; G01N 2021/4711; G01N
21/1702; G01N 21/6486; G01N
2201/067; G01N 2201/088; G01N
2291/02818; G01N 2291/0422; G01N
2291/106; G01N 2333/485; G01N
2333/91205; G01N 24/006; G01N
2400/50; G01N 2440/18; G01N 2570/00;
G01N 29/223; G01N 33/02; G01N 33/12;
G01N 33/48; G01N 33/533; G01N
33/5432; G01N 33/54353; G01N
33/6869; G01N 35/00; G01N 5/02; G01N
1/4022; G01N 13/00; G01N 15/1436;
G01N 2013/003; G01N 2021/0112; G01N
2021/1704; G01N 2021/212; G01N
2021/317; G01N 2021/3185; G01N
2021/4153; G01N 2021/5957; G01N
2021/635; G01N 2021/655; G01N
2021/8466; G01N 21/33; G01N 21/3577;
G01N 21/6489; G01N 2201/0616; G01N
2201/0631; G01N 2201/0695; G01N
2201/1211; G01N 2333/726; G01N
2333/9015; G01N 2333/912; G01N
2440/38; G01N 2500/20; G01N 27/3276;
G01N 27/44743; G01N 2800/24; G01N
2800/709; G01N 30/74; G01N 33/0031;
G01N 33/0098; G01N 33/4833; G01N
33/48707; G01N 33/48721; G01N
33/5032; G01N 33/5073; G01N 33/536;
G01N 33/56972; G01N 33/5735; G01N
33/57419; G01N 33/743; G01N 33/84;
G01N 35/02; G01N 35/1072; G01N 1/02;
G01N 1/286; G01N 1/38; G01N 15/0266;
G01N 15/0606; G01N 2001/2217; G01N
2001/4027; G01N 2001/4038; G01N
2015/0096; G01N 2015/019; G01N
2015/0261; G01N 2015/1027; G01N
2015/1445; G01N 2015/1454; G01N
2021/0378; G01N 2021/052; G01N
2021/1708; G01N 2021/414; G01N
2021/638; G01N 2021/646; G01N
2021/8411; G01N 2021/8825; G01N
2021/8854; G01N 2035/103; G01N
2035/1034; G01N 21/29; G01N 21/431;
G01N 21/53; G01N 21/63; G01N
21/8806; G01N 21/94; G01N 21/9501;
G01N 21/9505; G01N 2201/0638; G01N
2201/0683; G01N 2201/12; G01N
2291/023; G01N 2333/46; G01N
2333/47; G01N 2333/4712; G01N
2333/4727; G01N 2333/70521; G01N
2333/70532; G01N 2333/7151; G01N
2333/745; G01N 2333/90; G01N
2333/90209; G01N 2333/9121; G01N
2333/924; G01N 2333/992; G01N
2400/02; G01N 2405/04; G01N 27/3272;
G01N 27/4146; G01N 27/48; G01N
2800/042; G01N 2800/102; G01N
2800/20; G01N 2800/2835; G01N
2800/285; G01N 2800/34; G01N
2800/387; G01N 2800/70; G01N
2800/7028; G01N 30/6095; G01N
30/724; G01N 31/22; G01N 33/483;
G01N 33/4915; G01N 33/5029; G01N
33/5064; G01N 33/544; G01N 33/548;
G01N 33/5748; G01N 33/58; G01N
33/723; G01N 33/726; G01N 33/9493;
G01N 35/1002; G01N 1/18; G01N 1/30;
G01N 1/4044; G01N 15/06; G01N
15/0612; G01N 15/1404; G01N 15/1409;
G01N 15/1456; G01N 2001/002; G01N
2001/007; G01N 2001/1031; G01N
2001/1427; G01N 2001/2866; G01N
2015/016; G01N 2015/0687; G01N
2015/1486; G01N 2021/0364; G01N
2021/391; G01N 2021/432; G01N
2021/434; G01N 2021/6478; G01N
2021/772; G01N 2021/8438; G01N
2035/00227; G01N 21/314; G01N 21/43;
G01N 21/51; G01N 21/636; G01N 21/68;
G01N 21/718; G01N 21/7746; G01N
21/84; G01N 21/8422; G01N 2201/061;
G01N 2201/0664; G01N 2201/0696;
G01N 2203/0641; G01N 2291/015;
G01N 2333/162; G01N 2333/20; G01N
2333/445; G01N 2333/4704; G01N
2333/4706; G01N 2333/4737; G01N
2333/50; G01N 2333/54; G01N 2333/62;
G01N 2333/68; G01N 2333/70514; G01N
2333/8132; G01N 2470/06; G01N
2474/20; G01N 25/14; G01N 27/26;
G01N 27/327; G01N 27/3271; G01N
27/4166; G01N 27/44713; G01N 27/74;
G01N 2800/044; G01N 2800/301; G01N
2800/303; G01N 2800/304; G01N
2800/364; G01N 2800/7095; G01N
29/4436; G01N 30/6078; G01N 33/0034;
G01N 33/0096; G01N 33/025; G01N
33/5047; G01N 33/523; G01N 33/5436;
G01N 33/56905; G01N 33/56988; G01N
33/57426; G01N 33/5743; G01N
33/57438; G01N 33/66; G01N 33/6818;
G01N 33/6857; G01N 33/86; G01N
35/00584; G01N 35/028; G01N 35/1004;
G01N 35/1011; G01N 35/1079; G01N
35/109; G01N 7/10; G01N 1/10; G01N 1/24; G01N 1/2813; G01N 1/4005; G01N 13/02; G01N 15/0211; G01N 15/1023; G01N 19/00; G01N 2001/022; G01N 2001/2276; G01N 2001/242; G01N 2001/4016; G01N 2015/0046; G01N 2015/0222; G01N 2015/1024; G01N 2015/144; G01N 2021/0118; G01N 2021/0181; G01N 2021/0389; G01N 2021/0396; G01N 2021/1712; G01N 2021/1734; G01N 2021/437; G01N 2021/4709; G01N 2021/6495; G01N 2021/656; G01N 2021/7736; G01N 2021/7796; G01N 2021/786; G01N 2021/8845; G01N 2030/0015; G01N 2030/621; G01N 2030/625; G01N 2030/8441; G01N 2030/8831; G01N 2035/00138; G01N 2035/00237; G01N 2035/042; G01N 2035/0437; G01N 2035/0494; G01N 2035/1018; G01N 2035/1025; G01N 2035/1039; G01N 2035/1053; G01N 21/11; G01N 21/171; G01N 21/4795; G01N 21/75; G01N 21/8507; G01N 21/88; G01N 21/8851; G01N 2201/0642; G01N 2223/071; G01N 2223/08; G01N 2291/011; G01N 2291/012; G01N 2291/02416; G01N 2291/048; G01N 2291/2697; G01N 23/04; G01N 23/2204; G01N 23/2206; G01N 23/2251; G01N 23/2254; G01N 2333/16; G01N 2333/31; G01N 2333/43547; G01N 2333/43556; G01N 2333/44; G01N 2333/4713; G01N 2333/5437; G01N 2333/7051; G01N 2333/70517; G01N 2333/7156; G01N 2333/91051; G01N 2333/914; G01N 2333/96411; G01N 2333/96458; G01N 2333/96486; G01N 24/088; G01N 24/10; G01N 2400/10; G01N 2458/10; G01N 2469/10; G01N 27/02; G01N 27/129; G01N 27/30; G01N 27/414; G01N 27/44786; G01N 27/44795; G01N 27/453; G01N 27/60; G01N 27/623; G01N 2800/00; G01N 2800/04; G01N 2800/224; G01N 2800/2814; G01N 2800/2871; G01N 2800/36; G01N 29/00; G01N 29/032; G01N 29/07; G01N 29/11; G01N 29/12; G01N 29/221; G01N 29/2418; G01N 29/2443; G01N 29/4472; G01N 3/08; G01N 30/02; G01N 30/461; G01N 30/6004; G01N 30/7233; G01N 30/88; G01N 31/223; G01N 33/0045; G01N 33/48792; G01N 33/49; G01N 33/493; G01N 33/5017; G01N 33/5035; G01N 33/5041; G01N 33/505; G01N 33/5076; G01N 33/5079; G01N 33/5082; G01N 33/545; G01N 33/551; G01N 33/552; G01N 33/567; G01N 33/56938; G01N 33/57442; G01N 33/579; G01N 33/588; G01N 33/6812; G01N 33/6824; G01N 33/78; G01N 33/9433; G01N 35/00871; G01N 35/0099; G01N 35/026; G01N 35/1097; G01N 37/00

See application file for complete search history.

(56) References Cited

U.S. PATENT DOCUMENTS

| 2012/0201716 | A1 | 8/2012 | Matsuo et al. |
| 2016/0109693 | A1 | 4/2016 | Feng |

FOREIGN PATENT DOCUMENTS

| CN | 105717076 | A | * | 6/2016 | ............ G01N 21/01 |
| CN | 105486665 | B | * | 7/2018 | ........... G01N 21/553 |
| CN | 109141259 | A | * | 1/2019 | ............ G01B 11/06 |
| EP | 3104168 | A1 | * | 12/2016 | ........... G01N 21/553 |
| EP | 3 064 929 | B1 | | 11/2018 | |
| JP | 2003-514224 | A | | 4/2003 | |
| JP | 2004-526945 | A | | 9/2004 | |
| JP | 2009-204476 | A | | 9/2009 | |
| JP | 2016-042049 | A | | 3/2016 | |
| JP | WO2014017433 | A1 | * | 7/2016 | |
| JP | 2016176845 | A | * | 10/2016 | |
| JP | 6515617 | B2 | * | 5/2019 | |
| WO | 01/035081 | A1 | | 5/2001 | |
| WO | WO-2012042804 | A1 | * | 4/2012 | ........... G01N 21/648 |
| WO | 2014/017433 | A1 | | 1/2014 | |
| WO | WO-2015008492 | A1 | * | 1/2015 | ......... G01N 21/6428 |
| WO | WO-2015119154 | A1 | * | 8/2015 | ........... G01N 21/553 |
| WO | 2016/063240 | A1 | | 4/2016 | |
| WO | WO-2016170967 | A1 | * | 10/2016 | ............ G01N 21/03 |
| WO | WO-2018016383 | A1 | * | 1/2018 | ............ G01N 21/13 |
| WO | 2020/036010 | A1 | | 2/2020 | |

OTHER PUBLICATIONS

M. Palumbo, et al., "A single chip multi-channel surface plasmon resonance imaging system", Sensors and Actuators B: Chemical, Elsevier BV, NL, vol. 90, No. 1-3, Apr. 20, 2003, pp. 264-270 (7 pages total).

International Search Report dated Apr. 27, 2021 in International Application No. PCT/JP2021/005651.

International Preliminary Report on Patentability mailed Oct. 6, 2022 with a Translation of the Written Opinion of the International Searching Authority in Application No. PCT/JP2021/005651.

* cited by examiner

DETECTION DEVICE

CROSS-REFERENCE TO RELATED APPLICATIONS

This is a national phase application in the United States of International Patent Application PCT/JP2021/005651 with an international filing date of Feb. 16, 2021, which claims priority of Japanese Patent Application No. 2020-058608 filed on Mar. 27, 2020 the contents of which are incorporated herein by reference.

TECHNICAL FIELD

The present invention relates to a detection device that detects presence or an amount of a substance to be detected using an enhanced electric field based on surface plasmon resonance (SPR).

BACKGROUND ART

In measurement for detecting a biological substance such as protein or DNA, if a trace amount of a substance to be detected could be detected with high sensitivity and quantitatively, it would be possible to immediately grasp a patient's condition and conduct medical treatment. Therefore, there is a demand for a detection method and a detection device that detect weak light derived from a trace amount of a substance to be detected with high sensitivity and quantitatively. As one method for detecting a substance to be detected with high sensitivity, the surface plasmon-field enhanced fluorescent spectroscopy (SPFS) method or the SPR method is known.

In the SPFS or SPR method, a region on a metal film on which a capturing body for capturing a substance to be detected is immobilized is irradiated with excitation light to measure a concentration and presence or absence of the substance to be detected. In addition, in the SPFS or SPR method, since it is necessary to irradiate the region on the metal film with excitation light αt an angle near a resonance angle in order to generate plasmon enhancement, it is a general practice to perform signal measurement while changing an angle of the excitation light, or perform signal measurement by scanning the angle to detect an optimum angle and then setting the angle to the optimum angle.

Here, in order to accurately detect the amount or the presence of the substance to be detected, it is important to accurately irradiate a position where the substance to be detected is captured on the metal film with light in signal measurement.

For example, in JP 2016-042049 A, a substance to be detected is detected by emitting excitation light using a prism having a semicircular cross section. In the invention of JP 2016-042049 A, a scanning rotation center for changing the angle of the excitation light and a prism circle center (solid phase center) are set to coincide with each other, so that an irradiation position of the excitation light can be accurately determined even in a case of angle scanning.

In JP 2009-204476 A, a substance to be detected is detected by emitting excitation light using a prism having a trapezoidal cross section. In the invention of JP 2009-204476 A, an irradiation position of the excitation light can be accurately determined by setting a position where the substance to be detected is captured to be irradiated with the excitation light in consideration of refraction of an incident surface of the prism.

SUMMARY OT THE INVENTION

Problems to be Solved By The Invention

However, even if an irradiation position of excitation light is accurately set, an emission direction of light emitted from a light projecting unit may change due to a change in environment (temperature) or a temporal change. In particular, regarding a light source portion (a laser diode, a light emitting diode, or the like), temperature rises around the light source portion due to heat generated when light is generated. This temperature rise causes a deviation due to a linear expansion difference or the like of the light source portion, a lens, or a holding member (the light source and the lens are held by being press-fitted into the holding member or being bonded with an adhesive or the like) thereof, so that the light source portion (a light emitting point) becomes eccentric with respect to an optical system. As a result, a direction (an emission direction) of the light emitted from the light projecting unit changes, and an irradiation position on a metal film with the excitation light deviates, so that the light cannot be applied to an appropriate position, and detection accuracy may deteriorate in some cases.

Furthermore, not only the irradiation position deviates at a specific angle of the excitation light, but also the deviation of the irradiation position is increased for each angle when angle scanning is performed. For this reason, measurement performance for an enhancement angle is deteriorated (in the worst case, the irradiation position deviates from a region where a capturing body for capturing a substance to be detected is immobilized, and an incorrect enhancement angle is measured) in angle scanning measurement (enhancement angle measurement), so that an optimum angle of the excitation light cannot be set in the measurement of a signal derived from the substance to be detected, resulting in preventing highly accurate detection of the substance to be detected in some cases.

In view of the above problems, an object of the present invention is to provide a detection device that has high robustness against a temperature change and a temporal change and that is capable of detecting a substance to be detected with high accuracy.

Means for Solving the Problems

A detection device according to an embodiment of the present invention is a detection device that detects presence or an amount of a substance to be detected using an enhanced electric field based on surface plasmon resonance, the detection device including: a chip holder configured to hold a detection chip having a metal film and a capturing body for capturing a substance to be detected which is immobilized on the metal film; a light projecting unit configured to irradiate the metal film of the detection chip held by the chip holder with excitation light to generate the surface plasmon resonance; and a detection unit configured to detect light that is derived from the presence or the amount of the substance to be detected, and is generated by occurrence of the surface plasmon resonance as a result of irradiation of the metal film with the excitation light, in which the light projecting unit includes: a light source that emits the excitation light; a diaphragm for regulating a light flux emitted from the light source; and a conjugate optical system that optically conjugates an opening portion of the diaphragm and a region of the metal film irradiated with the excitation light.

A detection method according to an embodiment of the present invention is a detection method using the above detection device, the detection method including the steps of: detecting reflected light or transmitted light of the excitation light with which the detection chip held by the chip holder is irradiated to obtain position information of the detection chip; and adjusting a position of the detection chip on the basis of the position information of the detection chip.

According to the present invention, it is possible to provide a detection device that has high robustness against a temperature change and a temporal change and that is capable of detecting a substance to be detected with high accuracy.

DESCRIPTION OF EMBODIMENTS

Figure 1:
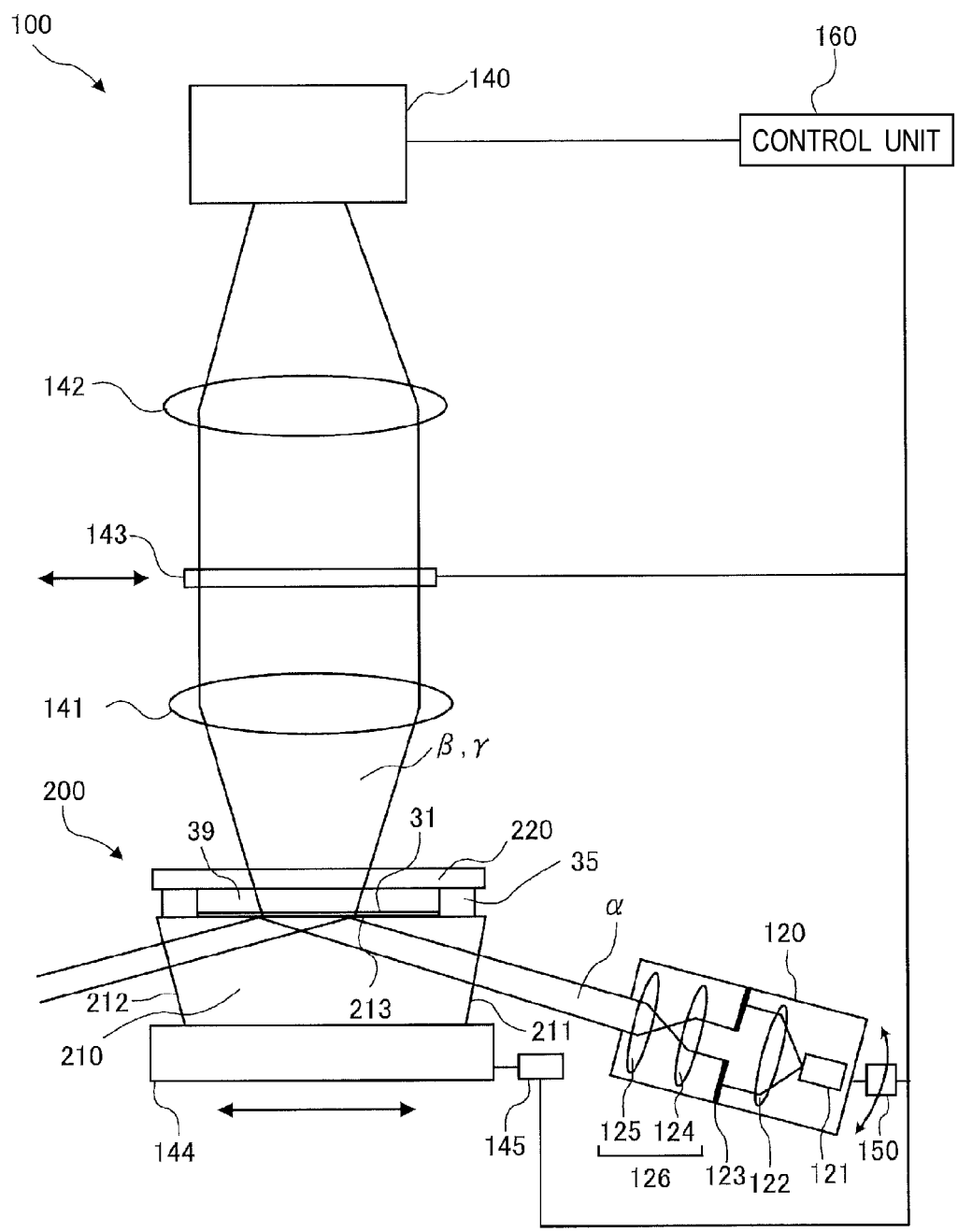
FIG. 1 is a view illustrating a detection device according to an embodiment of the present invention.

Hereinafter, embodiments of the present invention will be described in detail with reference to the drawings.
Configuration of Detection Device FIG. 1 is a view illustrating a detection device 100 according to an embodiment of the present invention.

The detection device 100 includes a light projecting unit 120 for irradiating a detection chip 200 with excitation light α, a light projecting unit angle adjustment unit 150, a fourth lens 141, a fifth lens 142, an excitation light cut filter 143, a detection unit 140 for detecting light (plasmon scattered light β or fluorescence γ) emitted from the detection chip 200, a chip holder 144, a detected chip position adjustment unit 145, and a control unit 160. The detection device 100 is used together with the detection chip 200. Therefore, the detection chip 200 will be described first, and then each component of the detection device 100 will be described.

As illustrated in FIG. 1, the detection chip 200 includes a prism 210 having an incident surface 211, a film formation surface 213, and an emission surface 212, a metal film 31 disposed on the film formation surface 213 of the prism 210, and a flow path lid 220 disposed on the metal film 31.

The prism 210 is made of a member transparent to the excitation light α. The prism 210 has the incident surface 211, the film formation surface 213 on which the metal film 31 is formed, and the emission surface 212. The incident surface 211 allows the excitation light α from the light projecting unit 120 to be incident into the inside of the prism 210. The metal film 31 is formed on the film formation surface 213. The excitation light α incident into the inside of the prism 210 is reflected by the metal film 31. More specifically, the light is reflected at an interface (the film formation surface 213) between the prism 210 and the metal film 31. The emission surface 212 allows the excitation light α reflected by the metal film 31 to be emitted to the outside of the prism 210. A shape of the prism 210 is not particularly limited. In the present embodiment, the prism 210 has a columnar shape with a trapezoid as a bottom surface. A surface corresponding to one base of the trapezoid is the film formation surface 213, a surface corresponding to one leg is the incident surface 211, and a surface corresponding to the other leg is the emission surface 212. The trapezoid serving as the bottom surface is preferably a substantially isosceles trapezoid. As a result, the incident surface 211 and the emission surface 212 are substantially symmetrical, and an S-polarized component of the excitation light α is totally reflected in the prism 210 and is thus hardly retained. Since only a P-polarized component of the excitation light α contributes to plasmon resonance, the S-polarized component will be reflected by the metal film 31. In addition, the incident surface 211 is formed so that the excitation light α does not return to the light projecting unit 120. This is because when the excitation light α returns to, for example, a light source 121 that is a laser diode in the light projecting unit 120, an excited state of the laser diode is disturbed to cause a wavelength and an output of the excitation light α to fluctuate. Therefore, an angle of the incident surface 211 is set such that the excitation light α is not perpendicularly incident on the incident surface 211 in a scanning range centered on an ideal enhancement angle. For example, an angle between the incident surface 211 and the film formation surface 213 and an angle between the film formation surface 213 and the emission surface 212 are both about 80°. Examples of the material of the prism 210 include resin and glass. The material of the prism 210 is preferably a resin having a refractive index of 1.4 to 1.6 and a small birefringence.

The metal film 31 is formed on the film formation surface 213 of the prism 210. By providing the metal film 31, an interaction (surface plasmon resonance; SPR) occurs between a photon of the excitation light α incident on the film formation surface 213 under a total reflection condition and a free electron in the metal film 31, so that an enhanced electric field (localized field light) can be generated on a surface of the metal film 31. The material of the metal film 31 is not particularly limited as long as it is metal that causes surface plasmon resonance. Examples of the material of the metal film 31 include gold, silver, copper, aluminum, and alloys thereof. Among them, the metal constituting the metal film 31 is preferably gold from the viewpoint of suppressing nonspecific adsorption of a substance in a specimen. In the present embodiment, the metal constituting the metal film 31 is gold. A method for forming the metal film 31 is not particularly limited. Examples of the method for forming the metal film 31 include sputtering, vapor deposition, and plating. Although a thickness of the metal film 31 is not particularly limited, it is preferably in the range of 30 to 70 nm.

Although not particularly illustrated, a capturing body for capturing a substance to be detected is immobilized on a surface of the metal film 31 not opposed to the prism 210. By immobilizing the capturing body, the substance to be detected can be selectively detected. In the present embodiment, the capturing body is uniformly immobilized in a predetermined region on the metal film 31. A kind of capturing body is not particularly limited as long as the capturing body can capture a substance to be detected. For example, the capturing body is an antibody or a fragment thereof specific to the substance to be detected.

The flow path lid 220 is disposed above the surface of the metal film 31 not opposed to the prism 210 with a flow path 39 interposed therebetween. In the present embodiment, the flow path lid 220 is joined to the film formation surface 213 or the metal film 31 via an adhesive layer 35. Specifically, the flow path lid 220 is joined to the metal film 31 or the prism 210 by, for example, adhesion using a double-sided tape or an adhesive, laser welding, ultrasonic welding, pressure bonding using a clamp member, or the like.

When the metal film 31 is formed only on a part of the film formation surface 213 of the prism 210, the flow path lid 220 may be disposed above the film formation surface 213 with the flow path 39 interposed therebetween. Together with the metal film 31 and the adhesive layer 35, the flow path lid 220 forms the flow path 39 through which a specimen, and a liquid such as a fluorescent labeling liquid, or a cleaning liquid flow. The capturing substance is exposed in the flow path 39. Both ends of the flow path 39 are connected to an injection port and a discharge port (both are not shown) formed on an upper surface of the flow path lid 220. When a liquid is injected into the flow path 39, the liquid comes into contact with the capturing substance in the flow path 39.

The flow path lid 220 is made of a material transparent to light (the plasmon scattered light β and the fluorescence γ) emitted from the surface of the metal film 31 not opposed to the prism 210 and from the vicinity of the surface. Examples of the material of the flow path lid 220 include resin. As long as such light can be guided to the detection unit 140, a part of the flow path lid 220 may be made of an opaque material.

As illustrated in FIG. 1, the excitation light α guided to the prism 210 enters the prism 210 from the incident surface 211. The excitation light α incident into the prism 210 enters the interface (the film formation surface 213) between the prism 210 and the metal film 31 so as to have a total reflection angle (an angle at which surface plasmon resonance occurs). The reflected light from the interface is emitted from the emission surface 212 to the outside of the prism 210. On the other hand, when the excitation light α is incident on the interface at the angle at which the surface plasmon resonance occurs, the plasmon scattered light β and/or the fluorescence γ is emitted from the metal film 31 and the vicinity thereof toward the detection unit 140.

Next, each component of the detection device 100 will be described. As described above, the detection device 100 includes the light projecting unit 120, the light projecting unit angle adjustment unit 150, the fourth lens 141, the fifth lens 142, the excitation light cut filter 143, the detection unit 140, the chip holder 144, the detected chip position adjustment unit 145, and the control unit 160.

The light projecting unit 120 irradiates the metal film 31 of the detection chip 200 held by the chip holder 144 with the excitation light α via the prism 210 to cause surface plasmon resonance.

The light projecting unit 120 includes the light source 121, a diaphragm 123, and a conjugate optical system 126. These will be described below.

The light source 121 emits the excitation light α. The light projecting unit angle adjustment unit 150 controlled by the control unit 160 adjusts a position and an orientation of the light projecting unit 120, thereby adjusting an incident angle of the excitation light α with respect to the interface (the film formation surface 213) between the prism 210 and the metal film 31. When the metal film 31 is irradiated with the excitation light α, the plasmon scattered light β having the same wavelength as the excitation light α, the fluorescence γ emitted from a fluorescent substance, and the like are emitted upward from the surface of the metal film 31 not opposed to the prism 210 and the vicinity of the surface. In addition, the excitation light α is reflected by the interface between the prism 210 and the metal film 31, and is emitted from the emission surface 212 to the outside of the prism 210.

In the present embodiment, the light source 121 is a laser diode (hereinafter abbreviated as "LD"), and emits the excitation light α (single mode laser light) toward the incident surface 211 of the detection chip 200. More specifically, the light source 121 emits only a P wave for the interface toward the incident surface 211 such that the excitation light α has the total reflection angle with respect to the interface (the film formation surface 213) between the prism 210 and the metal film 31 of the detection chip 200. Since enhancement in the electric field of the surface plasmon depends on the incident angle of the excitation light α, the excitation light α is preferably substantially collimated light. In the present embodiment, the excitation light α emitted from the light source 121 becomes substantially collimated light by a first lens 122. The first lens 122 may be configured with a plurality of lenses.

Note that the kind of the light source 121 is not particularly limited, and may not be an LD. Examples of the light source 121 include a light emitting diode, a mercury lamp, and other laser light sources. In a case where the light emitted from the light source 121 is not a beam, the light emitted from the light source 121 may be converted into a beam by a lens, a mirror, a pinhole, a slit, or the like. A beam size of the excitation light α is preferably controlled to 0.5 to 2.0 mm on the metal film 31. When the light emitted from the light source 121 is not monochromatic light, the light emitted from the light source 121 is preferably converted into monochromatic light by a diffraction grating, a wavelength filter, or the like. Furthermore, when the light emitted from the light source 121 is not linearly polarized light, the light emitted from the light source 121 is preferably converted into a linearly polarized light by a polarizer or the like.

The diaphragm 123 has an opening portion, and adjusts or regulates a light amount and a beam size of the light from the light source 121. In the present embodiment, the diaphragm 123 is disposed between the first lens 122 and a second lens 124 to be described later, blocks a part of the excitation light α which is collimated by the first lens 122, and adjusts or regulates the light amount and the beam size of the excitation light α entering the second lens 124. The opening size of the diaphragm 123 may be fixed, or the diaphragm 123 may be provided with a movable mechanism so that the size can be changed.

The shape of the opening portion of the diaphragm 123 is preferably oval or rectangular. The conjugate optical system 126 to be described later makes the opening portion of the diaphragm 123 and a region on the metal film 31 irradiated with light be optically conjugated. Therefore, when the shape, in the diaphragm 123, through which light passes is oval or rectangular, an appropriate region on the metal film 31 is easily irradiated with the excitation light α.

The conjugate optical system 126 is an optical system for optically conjugating the opening portion of the diaphragm 123 and the region on the metal film 31 irradiated with the excitation light α. A configuration of the conjugate optical system 126 is not particularly limited as long as the opening portion of the diaphragm 123 and the region on the metal film 31 irradiated with the excitation light α can be optically conjugated, and the kind of optical element (e.g., a lens, a mirror, or the like) to be used, a combination of optical elements, the number of optical elements, an arrangement of optical elements, and the like may be appropriately adjusted. Note that the term "optically conjugate" as used herein includes a case of being substantially conjugate within a range where the object of the present invention can be achieved. For example, there are included not only a case where the opening portion of the diaphragm 123 and the surface including the region on the metal film 31 irradiated with the excitation light α are optically conjugated, but also a case where the opening portion of the diaphragm 123, and a virtual plane inclined with respect to the metal film 31 including a part of the region on the metal film 31 irradiated with the excitation light α are optically conjugated.

The conjugate optical system 126 may be a reduction optical system that converts a light flux diameter so that an irradiation spot size of the excitation light α on the metal film 31 becomes smaller than a size of the opening portion of the diaphragm 123. The irradiation spot size of the excitation light α on the metal film 31 is preferably smaller than a size of a region where the capturing body on the metal film 31 is immobilized. In this way, the irradiation spot is easily accommodated in the region where the capturing body is immobilized on the metal film 31. The irradiation spot size on the metal film 31 is preferably smaller than a visual field size of the detection unit 140. In this way, the irradiation spot is easily accommodated in the visual field of the detection unit 140.

In the present embodiment, the conjugate optical system 126 includes the second lens 124 and a third lens 125 disposed between the diaphragm 123 and the prism 210. As a result, the conjugate optical system 126 is allowed to optically conjugate the opening portion of the diaphragm 123 and the region on the metal film 31 irradiated with the excitation light α.

Figure 2A:
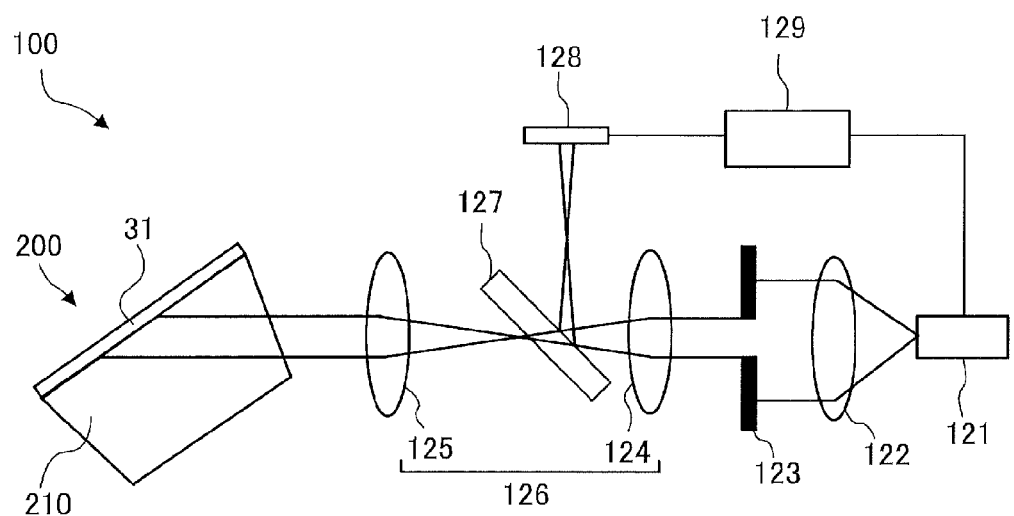
FIG. 2A illustrates a case where the detection device according to the embodiment of the present invention has a mechanism for adjusting output of a light source.

As illustrated in FIG. 2A, the detection device 100 according to the embodiment of the present invention may include a reflection member 127 for causing a part of light passing through the diaphragm 123 to be reflected, a reflected light detection unit 128 for detecting the light reflected by the reflection member 127, and a feedback control unit 129 for adjusting an output of the light source 121 according to an amount of the light detected by the reflected light detection unit 128. Note that the control unit 160 may play the role of the feedback control unit 129.

In the detection device 100, when a temperature change or a temporal change occurs, the position of the light source 121 may become eccentric, an amount of light passing through the opening portion of the diaphragm 123 may change, and an amount of light emitted from the light projecting unit 120 may change. Since the detection device 100 has the above-described configuration, the output of the light source 121 can be increased when the light from the light projecting unit 120 becomes weak, and the output of the light source 121 can be decreased when the light from the light projecting unit 120 becomes strong. As a result, the amount of light incident on the metal film 31 on the prism 210 of the detection chip 200 can be stabilized to improve measurement accuracy.

Figure 2B:
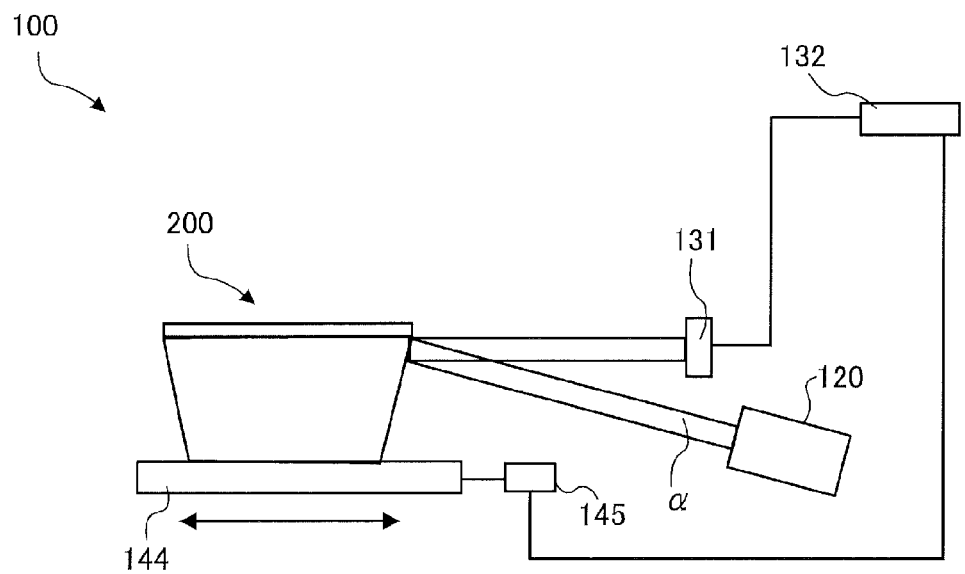
FIG. 2B illustrates a case where the detection device according to the embodiment of the present invention has a mechanism for determining a position of a detection chip.

As illustrated in FIG. 2B, the detection device 100 according to the embodiment of the present invention may include a chip optical signal detection unit 131 for detecting reflected light or transmitted light generated in the detection chip 200 held by the chip holder 144 when the detection chip 200 is irradiated with the excitation light α, a chip position detection unit 132 for detecting a position of the detection chip 200 according to an output value of the chip optical signal detection unit 131, and the detected chip position adjustment unit 145 for moving the detection chip 200 to a measurement position on the basis of the chip position detected by the chip position detection unit 132. The chip optical signal detection unit 131 includes, for example, an image pickup device, a photodiode, and the like. The chip position detection unit 132 includes, for example, a known computer or microcomputer including an arithmetic device, a control device, a storage device, an input device, and an output device. As a mechanism for moving such detection chip 200 to the measurement position, for example, a mechanism disclosed in WO 2015/064704 A is suitably used. Since the detection device 100 has such a mechanism for moving the detection chip 200 to the measurement position as described above, positional accuracy of the detection chip 200 is improved to improve the measurement accuracy. Note that the control unit 160 may play the role of the chip position detection unit 132.

The fourth lens 141 and the fifth lens 142 form an image of the plasmon scattered light β or the fluorescence γ emitted from the metal film 31 on a light receiving portion of the detection unit 140. The fourth lens 141 is, for example, a condensing lens, and condenses light emitted from the metal film 31. The fifth lens 142 is, for example, an image forming lens, and forms an image of light condensed by the fourth lens 141 on the light receiving portion of the detection unit 140. Optical paths between the two lenses are substantially parallel optical paths. Furthermore, in a case where the detection unit 140 is a photodiode, a photomultiplier tube, or the like, it is not always necessary to form an image on the detection unit 140, and it is only necessary to have light condensed on the detection unit 140.

The excitation light cut filter 143 blocks the plasmon scattered light β, stray light derived from the excitation light α, and the like, and causes the fluorescence γ to be transmitted, thereby preventing light other than light having the wavelength of the fluorescence γ from reaching the detection unit 140. In other words, the excitation light cut filter 143 removes a noise component from the light emitted from the metal film 31, and enables the detection unit 140 to detect the fluorescence γ at a high S/N ratio. Although in FIG. 1 showing the present embodiment, the excitation light cut filter 143 is disposed between the fourth lens 141 and the fifth lens 142, the excitation light cut filter 143 is removed from the optical path so that the plasmon scattered light β can be detected when determining an enhancement angle.

The detection unit 140 irradiates the metal film with the excitation light α to detect light that is derived from presence or amount of a substance to be detected, and is generated by the occurrence of surface plasmon resonance. In the present embodiment, the detection unit 140 is arranged to be opposed to the surface of the metal film 31 of the detection chip 200, the surface being not opposed to the prism 210. The detection unit 140 receives the light (the plasmon scattered light β or the fluorescence γ) emitted from the metal film 31. The light receiving portion of the detection unit 140 is configured with, for example, an image pickup device, a photoelectron multiplier tube, a photodiode, or the like. The fourth lens 141, the excitation light cut filter 143, the fifth lens 142, and the detection unit 140 are disposed in this order from the side of the metal film 31 so as to be opposed to the surface of the metal film 31.

The detection chip 200 is installed in the chip holder 144. The chip holder 144 is not particularly limited as long as the detection chip 200 can be installed therein. The chip holder 144 has a shape that enables the detection chip 200 to be installed and that does not interfere with the optical paths of the excitation light α, the reflected light, the fluorescence γ, and the like. For example, the chip holder 144 is provided with an opening through which such light passes.

For example, the detected chip position adjustment unit 145 moves the chip holder 144 on the basis of the detection chip position detected by the chip position detection unit 132. For example, the detected chip position adjustment unit 145 moves the chip holder 144 in one direction and the opposite direction. The detected chip position adjustment unit 145 is, for example, a motor.

The control unit 160 collectively controls the light projecting unit 120, the excitation light cut filter 143, the detection unit 140, and the detected chip position adjustment unit 145. Specifically, the control unit 160 controls the position, the orientation, and the position of the light projecting unit 120, and sets the incident angle of the excitation light α with respect to the metal film 31 to a predetermined angle. Furthermore, the control unit controls the output (light amount, ON/OFF) of the light source 121. When determining the enhancement angle, the control unit 160 removes the excitation light cut filter 143 from the optical path so that the plasmon scattered light β reaches the detection unit 140. Furthermore, when receiving the fluorescence γ, the control unit 160 disposes the excitation light cut filter 143 on the optical path so that light (the plasmon scattered light β, stray light derived from the excitation light α, or the like) having the same wavelength as the excitation light α does not reach the detection unit 140. In addition, the control unit 160 controls the detected chip position adjustment unit 145 to move the chip holder 144 and change a detection range of the detection unit 140. The control unit 160 is, for example, a computer that executes software.

Although the embodiment of the present invention has been described in the foregoing with respect to a case where the detection device 100 is a prism coupling (PC)-SPFS device, the detection device 100 may be a grating coupling (GC)-SPFS device. In addition, the detection device 100 according to the embodiment of the present invention may be a prism coupling (PC)-SPR device or a lattice coupling (GC)-SPR device.

Operation of Detection Device

First, preparation for detection is conducted. Specifically, the detection chip 200 is installed at a predetermined position of the detection device 100.

Next, a substance to be detected in a specimen and a capturing substance are reacted (primary reaction). Specifically, the specimen is injected into the flow path 39 to bring the specimen and the capturing substance into contact with each other. In a case where the substance to be detected is present in the specimen, at least a part of the substance to be detected is captured by the capturing substance. Thereafter, the inside of the flow path 39 is washed with a buffer solution or the like to remove a substance not captured by the capturing substance. The kind of specimen is not particularly limited. Examples of the specimen include body fluids such as blood, serum, plasma, urine, nasal fluid, saliva, and semen, and diluted solutions thereof.

Next, alignment of the detection chip 200 may be optionally performed by such a mechanism as illustrated in FIG. 2B. Specifically, the detection chip 200 held by the chip holder 144 is irradiated with the excitation light α emitted from the light projecting unit 120 to detect reflected light or transmitted light of the emitted excitation light α by the chip optical signal detection unit 131. Next, the chip position detection unit 132 detects a position of the chip according to an output value of the chip optical signal detection unit 131. In this way, position information of the detection chip 200 can be obtained. Next, the detected chip position adjustment unit 145 adjusts the position of the detection chip 200 on the basis of the position information of the detection chip 200.

The enhancement angle is then measured. Specifically, while irradiating a predetermined position of the metal film 31 (the film formation surface 213) with the excitation light α, the incident angle of the excitation light α with respect to the metal film 31 (the film formation surface 213) is scanned to determine an optimum incident angle. This is performed by the control unit 160 controlling the light projecting unit 120 to scan the incident angle of the excitation light α with respect to the metal film 31 (the film formation surface 213) while irradiating a predetermined position of the metal film 31 (the film formation surface 213) with the excitation light α. Furthermore, the control unit 160 controls the excitation light cut filter 143 so as not to exist on the optical path, and controls the detection unit 140 so that the detection unit 140 detects the plasmon scattered light β from the metal film 31 (the surface of the metal film 31 and the vicinity of the surface). The plasmon scattered light β from the metal film 31 (the surface of the metal film 31 and the vicinity of the surface) reaches the detection unit 140 via the fourth lens 141 and the fifth lens 142. As a result, the control unit 160 obtains data including a relationship between an incident angle of the excitation light α and an intensity of the plasmon scattered light β. Then, the control unit 160 analyzes the data and determines an incident angle (enhancement angle) at which the intensity of the plasmon scattered light β is maximized. Note that although the enhancement angle is basically determined by a material and a shape of the prism 210, a thickness of the metal film 31, a refractive index of a liquid in the flow path 39, and the like, the enhancement angle slightly varies due to various factors such as a kind and an amount of a substance in the flow path 39, and a shape error of the prism 210. Therefore, it is preferable to determine an enhancement angle each time the analysis is performed. The enhancement angle is determined on the order of about 0.1°.

Next, the incident angle of the excitation light α with respect to the metal film 31 (the film formation surface 213) is set to the enhancement angle determined in the previous step. Specifically, the control unit 160 controls the light projecting unit 120 to set the incident angle of the excitation light α with respect to the metal film 31 (the film formation surface 213) to the enhancement angle. In subsequent steps, the incident angle of the excitation light α with respect to the metal film 31 (the film formation surface 213) remains at the enhancement angle.

Next, the substance to be detected which is captured by the capturing substance is labeled with a fluorescent substance (secondary reaction). Specifically, a fluorescent labeling liquid is injected into the flow path 39. The fluorescent labeling liquid is, for example, a buffer solution containing an antibody (secondary antibody) labeled with a fluorescent substance. When the fluorescent labeling liquid is injected into the flow path 39, the fluorescent labeling liquid comes into contact with the substance to be detected, and the substance to be detected is labeled with a fluorescent substance. Thereafter, the inside of the flow path 39 is washed with a buffer solution or the like to remove free fluorescent substances and the like.

Next, the metal film 31 (the film formation surface 213) is irradiated with the excitation light α to detect the fluorescence γ emitted from the fluorescent substance on the metal film 31 (the surface of the metal film 31 and the vicinity of the surface). Specifically, the control unit 160 controls the light projecting unit 120 to emit the excitation light α. At the same time, the control unit 160 controls the detection unit 140 such that detection unit 140 detects the fluorescence γ emitted from the metal film 31 (the metal film 31 and its vicinity).

At this time, the control unit 160 moves the excitation light cut filter 143 such that the excitation light cut filter 143 exists on the optical path. As a result, since the excitation light cut filter 143 does not transmit the plasmon scattered light β, only the fluorescence γ is detected by the detection unit 140.

Optical Path of Detection Device

Figure 3A:
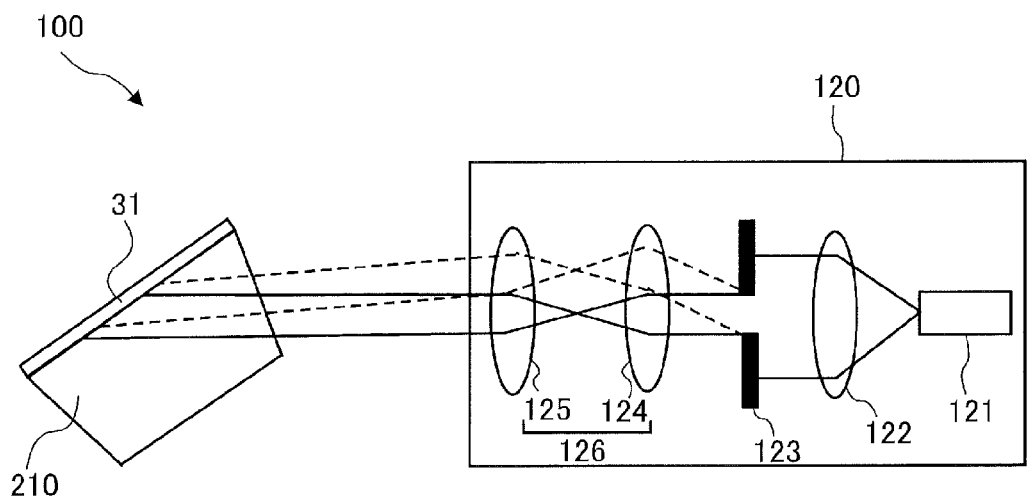
FIG. 3A illustrates an example of an optical path in the detection device according to the embodiment of the present invention.
Figure 3B:
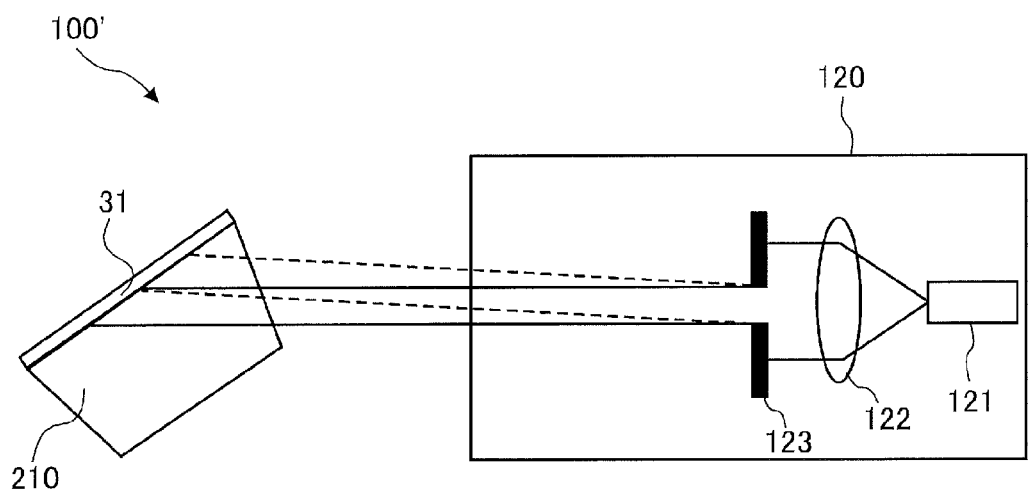
FIG. 3B illustrates an example of an optical path in a detection device for comparison.

FIG. 3A illustrates an example of the optical path in the detection device 100 according to the embodiment of the present invention. By contrast, FIG. 3B illustrates an example of an optical path in a detection device 100' for comparison. As illustrated in FIG. 2A, the light projecting unit 120 in the detection device 100 according to the embodiment of the present invention includes the conjugate optical system 126, whereas the detection device 100' for comparison does not include the conjugate optical system 126. As a result, the optical path from the light source 121 may be different as described below.

As illustrated in FIG. 3A, light emitted from the light source 121 passes through the first lens 122 to become collimated light whose beam size is regulated by the diaphragm 123. Next, the light having passed through the diaphragm 123 passes through the conjugate optical system 126 including the second lens 124 and the third lens 125, and is applied to the metal film 31 on the prism 210.

Here, regarding the light that has passed through the diaphragm 123, a solid line indicates a case where the light is emitted from the light source 121 at a predetermined angle without being eccentric to the optical system, and a broken line indicates a case where the light source 121 becomes eccentric, i.e., a case where the light is emitted from the light source 121 at an angle different from the predetermined angle. The broken line illustrates only a part from the diaphragm 123 to the metal film 31, and a part preceding the diaphragm 123 is not illustrated. As indicated by the solid line, in the case where the light is emitted at the predetermined angle, a predetermined position on the metal film 31 is irradiated with the light as predetermined. In addition, as indicated by the broken line, when the light source 121 becomes eccentric, i.e., in a case where the light is emitted from the light source 121 at an angle different from the predetermined angle, the vicinity of the predetermined position on the metal film 31 is irradiated with the light. This is because the conjugate optical system 126 of the detection device 100 according to the embodiment of the present invention is set so as to optically conjugate a diaphragm position where the light from the light source 121 passes through the diaphragm 123 and the position on the metal film 31 irradiated with the light.

On the other hand, as illustrated in FIG. 3B, in the detection device 100' for comparison, as indicated by the solid line, in the case where the light is emitted at the predetermined angle, the position on the metal film 31 is irradiated with the light as predetermined. However, as indicated by the broken line, in the case where the light is not emitted at the predetermined angle, the light is applied to a position greatly different from the predetermined position on the metal film 31. This is because the detection device 100' for comparison does not have the conjugate optical system 126.

Simulation of Optical Path in Angle Scanning

Figure 4A:
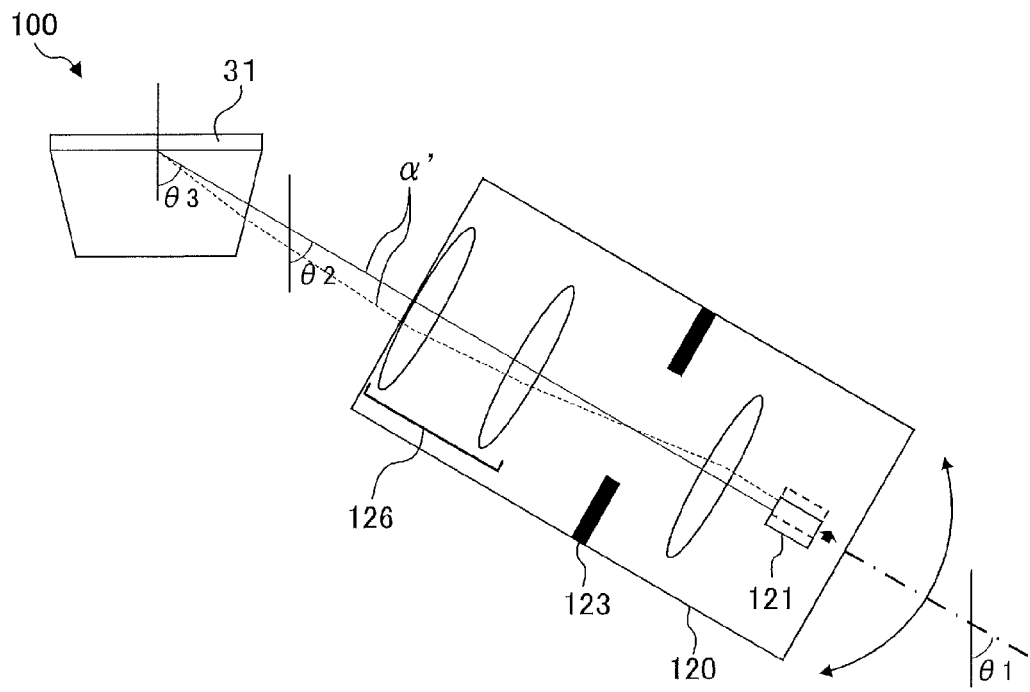
FIG. 4A illustrates a case where a position of a light source is deviated in the detection device according to the embodiment of the present invention.
Figure 4B:
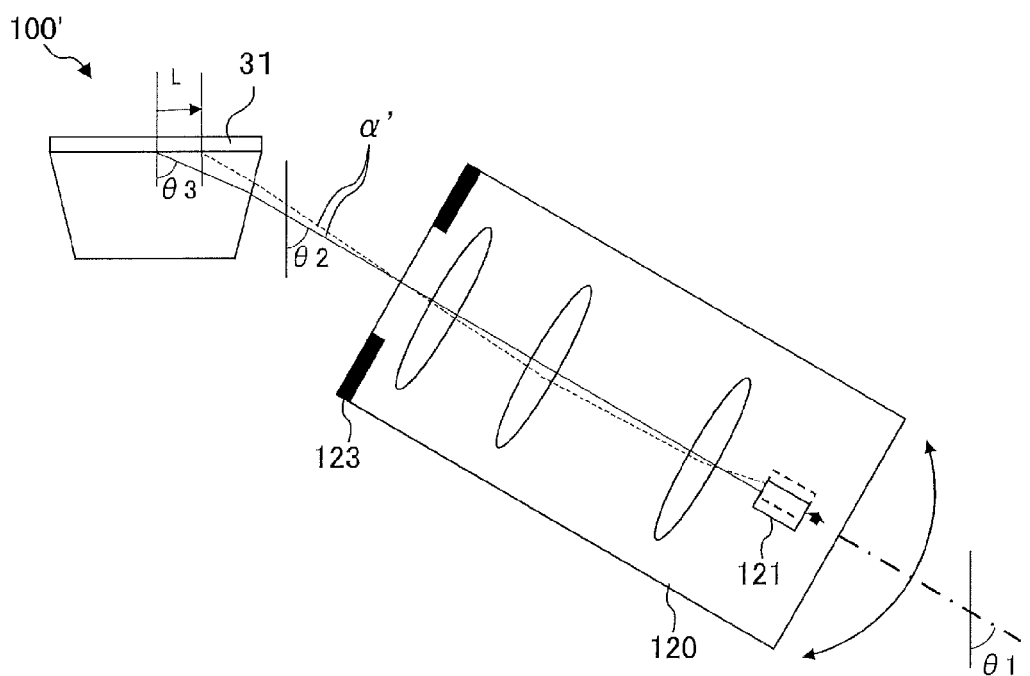
FIG. 4B illustrates a case where a position of a light source is deviated in the detection device for comparison.

FIGS. 4A and 4B illustrate a mode in which, in each of the detection device 100 according to the embodiment of the present invention and the detection device 100' for comparison, when the position of the light source 121 of the light projecting unit 120 becomes eccentric in a direction perpendicular to an optical axis of the optical system due to a temperature change, a temporal change, or the like, a light beam path of a main light beam α' of the excitation light α and an incident angle on the metal film 31 change, and an irradiated position of the metal film 31 changes. The detection device 100 includes the conjugate optical system 126 for optically conjugating the opening portion of the diaphragm 123 and the region of the metal film 31 irradiated with the excitation light α. By contrast, while the detection device 100' includes three lenses similarly to the detection device 100, these lenses are not for optically conjugating the opening portion of the diaphragm 123 and the region of the metal film 31 irradiated with the excitation light.

In FIGS. 4A and 4B, a solid line indicates a case where the light source 121 is located at a set position and the light beam path of the main light beam α' is in accordance with setting. On the other hand, a broken line indicates a case where the light source 121 is at a position deviated from the set position, and the light beam path of the main light beam α' is deviated. Here, a scanning angle of the light projecting unit 120 is defined as θ1. An angle formed by an angle of light emitted from the light projecting unit 120 and a direction (a gravity direction) perpendicular to a horizontal plane of the metal film 31 is defined as a light projecting angle θ2 of the light projecting unit 120. An angle at which the main light beam α' is incident on the metal film 31 is defined as θ3. Further, a deviation of a position where the main light beam α' is incident on the metal film 31 from the predetermined position is defined as L. Note that in FIGS. 4A and 4B, only the main light beam α' of the light flux is illustrated, and the main light beam α' is a light beam, in the excitation light α, that passes through the center of the diaphragm 123. The angles of θ2 and θ3 are changed by scanning of the light projecting unit 120.

Figure 5A:
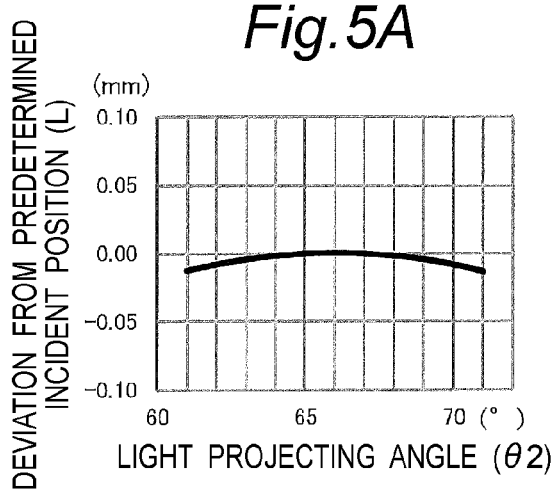
FIGS. 5A, 5B, and 5C illustrate changes in an incident position of light in a case where an angle of a light projecting unit is scanned in the detection device according to the embodiment of the present invention.
Figure 5D:
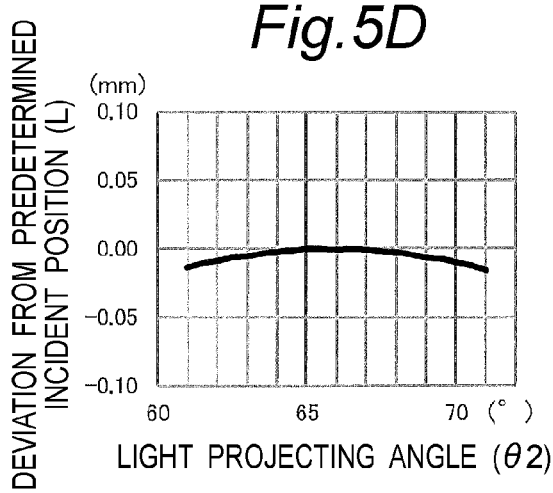
FIGS. 5D, 5E, and 5F illustrate changes in an incident position of light in a case where an angle of a light projecting unit is scanned in the detection device for comparison.
Figure 5B:
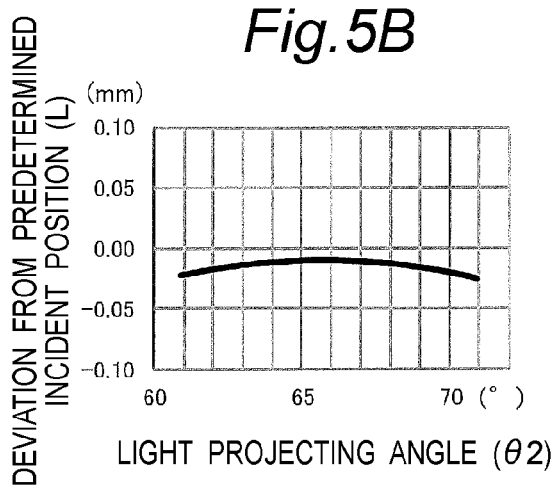
Figure 5E:
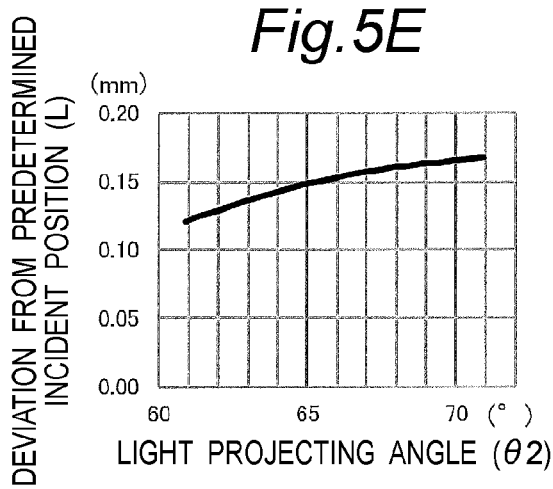
Figure 5C:
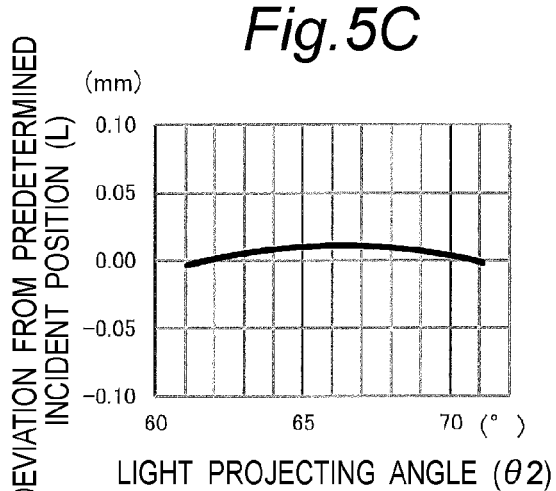

FIGS. 5A, 5B, and 5C each illustrate a relationship between the light projecting angle θ2 of the main light beam α' emitted from the light projecting unit 120 when the scanning angle θ1 of the light projecting unit 120 is scanned and the deviation L of the main light beam α' from a predetermined incident position (L=0) on the metal film 31 in the detection device 100 according to the embodiment of the present invention as illustrated in FIG. 4A. Note that the main light beam α' is a main light beam of the excitation light α (a light beam passing through the center of the diaphragm), and indicates a light beam, of the excitation light α, passing through substantially the center of a beam cross section.

FIG. 5A illustrates a case where the light source 121 is at a predetermined position without deviation due to temperature change or the like. FIG. 5B illustrates a case where the light source 121 is deviated from the predetermined position in a direction perpendicular to an optical axis, as indicated by the broken line in FIG. 4A. FIG. 5C illustrates a case where the light source 121 is deviated in a direction opposite to that in FIG. 5B from the predetermined position toward the direction perpendicular to the optical axis.

In each of FIGS. 5B and 5C, the deviation amount of the light source 121 is 3.2 μm. In FIGS. 5A, 5B, and 5C, a combined focal length of the optical system of the entire light projecting unit is 1.86 mm. As a result of the deviation of the light source 121, the light projecting angle θ2 is deviated by −0.1° and +0.1° from a predetermined value, respectively. Further, it is designed such that when the scanning angle θ1 of the light projecting unit 120 is 66°, the incident position of the main light beam α' comes to the predetermined position (L=0). Note that the detection chip 200 is assumed to be installed at a predetermined position.

It can be seen from comparison of FIG. 5A with FIGS. 5B and 5C that in the detection device 100 according to the embodiment of the present invention, even if the position of the light source 121 deviates from the predetermined position, the deviation amount L of the incident position from the predetermined position (L=0) on the metal film 31 is small at the same light projecting angle θ2. Specifically, in the detection device 100 according to the embodiment of the present invention, even if the position of the light source 121 is deviated due to a temperature change, a temporal change, or the like, the deviation of the incident position from the predetermined position is small at the same light projecting angle θ2, and thus, the detection device is hardly affected by measurement variations due to in-plane unevenness of a detected substance of the metal film 31 or a supplement, and the excitation light α hardly deviates from a region where the supplement is immobilized, resulting in improving measurement accuracy of signal measurement. In addition, even with respect to a deviation of the position of the light source 121 due to a temperature change during measurement, a deviation of the incident position of the excitation light α from the predetermined position is reduced, so that the measurement accuracy is similarly improved.

It can be also seen from each of FIGS. 5B and 5C that a change amount of the deviation amount L is small when the angle of the light projecting unit 120 is scanned to have a change in the light projecting angle θ2. Specifically, since in enhancement angle measurement, the deviation of the incident position at the time of angle scanning (at the time of the enhancement angle measurement) of the light projecting unit 120 is small, similarly to the above, the detection device is hardly affected by measurement variations due to in-plane unevenness of a substance to be detected of the metal film 31 or a supplement, and the excitation light α hardly deviates from the region where the supplement is immobilized, resulting in improving measurement accuracy of an enhancement angle. These are because the detection device 100 includes the conjugate optical system 126.

Figure 5F:
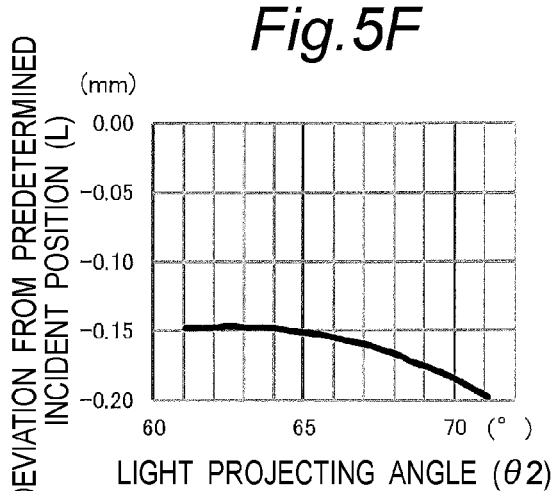

By contrast, FIGS. 5D, 5E, and 5F illustrate a relationship between the light projecting angle θ2 of the main light beam α' emitted from the light projecting unit 120 when the scanning angle θ1 of the light projecting unit 120 is scanned and the deviation L of the main light beam α' from the predetermined incident position (L=0) on the metal film 31 in the detection device 100' for comparison as illustrated in FIG. 4B. FIG. 5D illustrates a case where the light source 121 is at the predetermined position without deviation due to a temperature change or the like. FIG. 5E illustrates a case where the light source 121 is deviated from the predetermined position in the direction perpendicular to the optical axis as indicated by the broken line in FIG. 4B. FIG. 5F illustrates a case where the light source 121 is deviated in a direction opposite to that in FIG. 5E from the predetermined position toward the direction perpendicular to the optical axis.

In each of FIGS. 5E and 5F, the deviation amount of the light source 121 is 3.2 μm similarly to FIGS. 5B and 5C. In FIGS. 5D, 5E, and 5F, the combined focal length of the optical system of the entire light projecting unit is 1.86 mm. The detection chip 200 is installed at the predetermined position.

It can be seen from comparison of FIG. 5D with FIGS. 5E and 5F that in the detection device 100' for comparison, when the position of the light source 121 deviates from the predetermined position, not only the deviation amount L of the incident position from the predetermined position (L=0) on the metal film 31 is large at the same light projecting angle θ2, but also the change amount of L is large when the angle of the light projecting unit 120 is scanned.

Specifically, in the detection device 100' for comparison, the deviation of the incident position from the predetermined position is large at the same light projecting angle θ2, and when the position of the light source 121 is deviated due to a temperature change, a temporal change, or the like, the irradiation position of the excitation light α is greatly deviated from the predetermined position. Therefore, the detection device is easily affected by measurement variations due to in-plane unevenness of the substance to be detected of the metal film 31 or a supplement, and the excitation light α easily deviates from the region where the supplement is immobilized, resulting in improving the measurement accuracy of the signal measurement.

Furthermore, in the enhancement angle measurement, the deviation of the incident position at the time of angle scanning of the light projecting unit 120 (at the time of the enhancement angle measurement) is large, and similarly to the above, the detection device is easily affected by measurement variations due to in-plane unevenness of the substance to be detected of the metal film 31 or a supplement, and the excitation light α easily deviates from the region where the supplement is immobilized, resulting in deteriorating the measurement accuracy of the enhancement angle.

These are because the detection device 100' does not have the conjugate optical system 126.

Similarly to FIGS. 5A to 5C and 5D to 5F, respectively, FIGS. 6A to 6C and 6D to 6F illustrate a relationship between the light projecting angle θ2 of the main light beam α' emitted from the light projecting unit 120 when the scanning angle θ1 of the light projecting unit 120 is scanned and the deviation L of the main light beam α' from the predetermined incident position (L=0) on the metal film 31 in the detection device 100 according to the embodiment of the present invention and the detection device 100' for comparison as illustrated in FIGS. 4A and 4B, respectively.

Figure 6A:
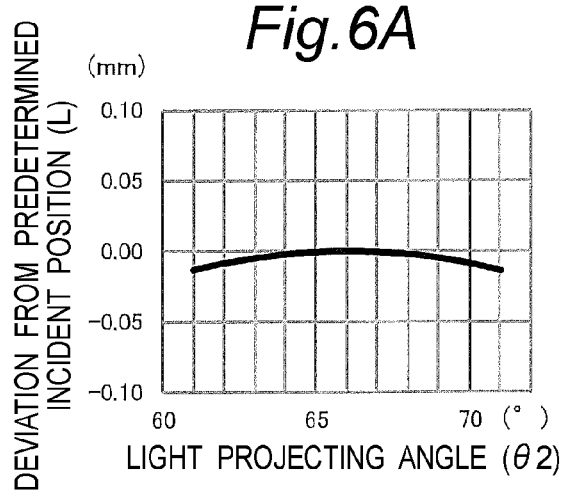
FIGS. 6A, 6B, and 6C illustrate changes in an incident position of light in a case where the angle of the light projecting unit is scanned after the detection chip is aligned in the detection device according to the embodiment of the present invention.
Figure 6D:
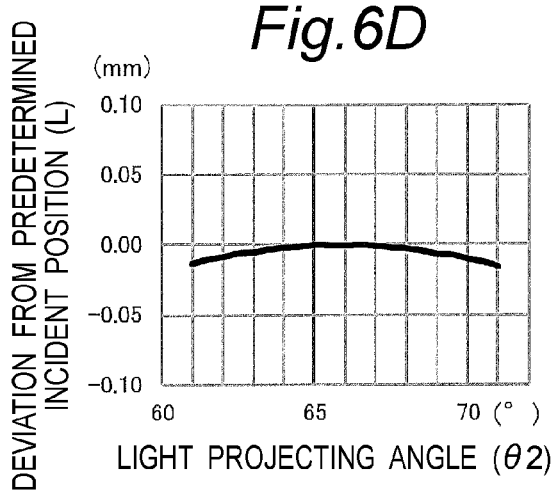
FIGS. 6D, 6E, and 6F illustrate changes in an incident position of light in a case where the angle of the light projecting unit is scanned after a detection chip is aligned in the detection device for comparison.
Figure 6B:
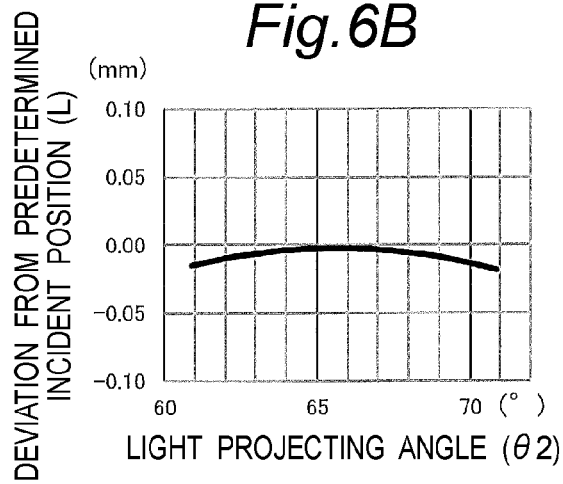
Figure 6E:
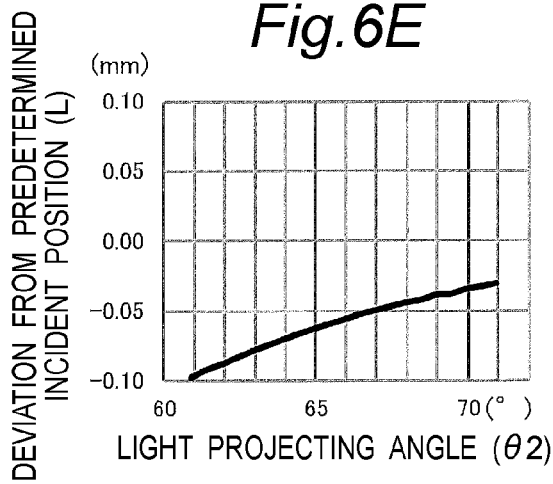

Furthermore, in FIGS. 6A to 6F, the position of the detection chip 200 is set by performing alignment of the detection chip 200 through the step of obtaining position information of the detection chip 200 and the step of adjusting the position of the detection chip on the basis of the position information of the detection chip in such mechanism as illustrated in FIG. 2B. Note that FIGS. 6A and 6D illustrate a case where the light source 121 is at the predetermined position, FIGS. 6B and 6E illustrate a case where the light source 121 deviates similarly to FIGS. 5B and 5E, and FIGS. 6C and 6F illustrate a case where the light source 121 deviates in the opposite direction similarly to FIGS. 5C and 5F. In the step of obtaining the position information of the detection chip 200, with the scanning angle θ1 of the light projecting unit 120 set to 72°, the detection chip 200 is irradiated with the excitation light α to detect the chip position.

Figure 6C:
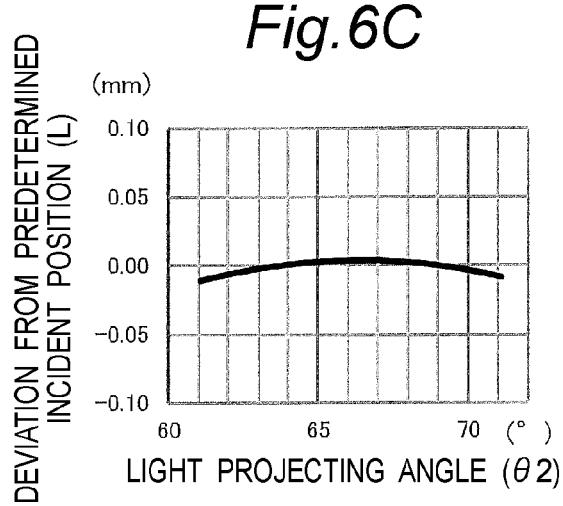

It can be seen from comparison of FIG. 6A with FIGS. 6B and 6C that in the detection device 100 according to the embodiment of the present invention, even if the detection chip 200 is aligned in a state where the light source 121 deviates from the predetermined position, the deviation amount L from the predetermined incident position (L=0) on the metal film 31 is small. This is because the detection device 100 includes the conjugate optical system 126, and thus, in such mechanism as illustrated in FIG. 2B, a deviation of a position where the excitation light hits the detection chip 200 is small, resulting in enabling the detection chip 200 to be easily aligned at an optimum position.

Figure 6F:
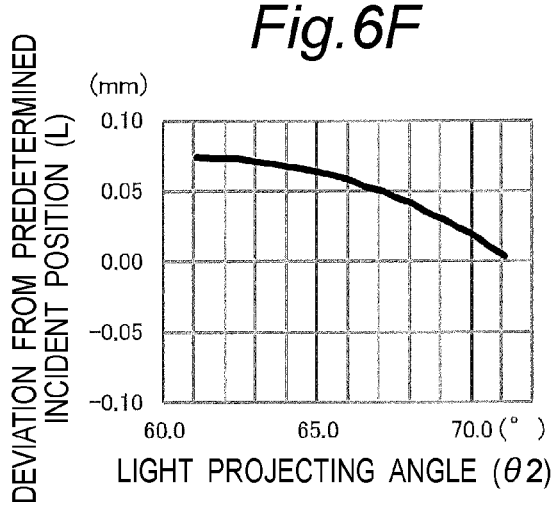

By contrast, it can be seen from comparison of FIG. 6D with FIGS. 6E and 6F that in the detection device 100', when the detection chip is aligned in a state where the light source 121 deviates from the predetermined position, the deviation L from the predetermined incident position on the metal film 31 is large. This is because the detection device 100' does not have the conjugate optical system 126, and thus, the deviation of the position where the excitation light α hits the detection chip 200 is large in such mechanism as illustrated in FIG. 2B, resulting in making it difficult to align the detection chip 200 at the optimum position.

Similarly to FIGS. 6A to 6C and FIGS. 6D to 6F, FIGS. 7A to 7C and FIGS. 7D to 7F illustrate a case where the detection chip 200 is aligned by such mechanism as illustrated in FIG. 2B in the detection device 100 according to the embodiment of the present invention and the detection device 100' for comparison illustrated in FIG. 4A and FIG. 4B, respectively. Note that FIGS. 7A to 7F are different from FIGS. 6A to 6F in illustrating a relationship between the light projecting angle θ2 of the main light beam α' emitted from the light projecting unit 120 when the scanning angle θ1 of the light projecting unit 120 is scanned and a deviation L' of the incident position of the main light beam α' on the metal film 31 from a predetermined center of a visual field (L'=0) on the metal film 31 of the detection unit 140. Further, it is designed such that the incident position of the main light beam α' comes to the predetermined position (L'=0) when the scanning angle θ1 of the light projecting unit 120 is 66°.

Figure 7A:
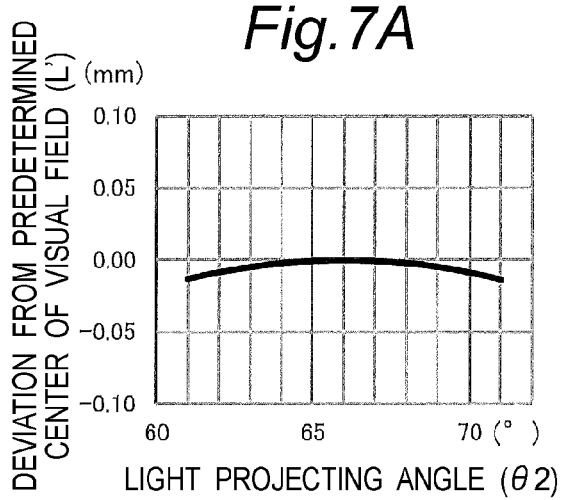
FIGS. 7A, 7B, and 7C illustrate changes in an incident position of light from the center of a visual field in a case where the angle of the light projecting unit is scanned after the detection chip is aligned in the detection device according to the embodiment of the present invention.
Figure 7D:
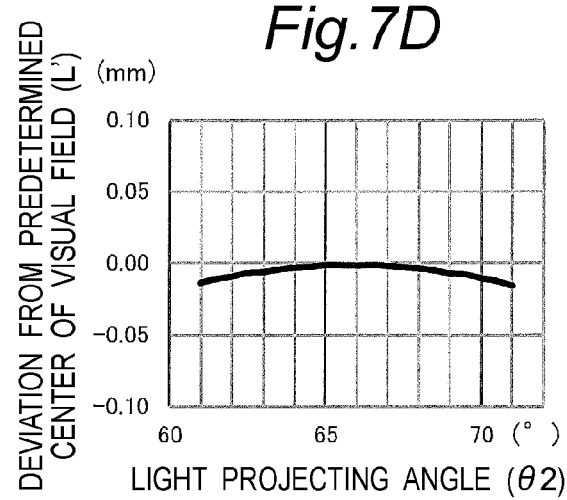
FIGS. 7D, 7E, and 7F illustrate changes in an incident position of light from the center of a visual field in a case where the angle of the light projecting unit is scanned after the detection chip is aligned in the detection device for comparison.

Note that FIGS. 7A and 7D illustrate a case where the light source 121 is at the predetermined position similarly to FIGS. 6A and 6D, FIGS. 7B and 7E illustrate a case where the light source 121 deviates similarly to FIGS. 6B and 6E, and FIGS. 7C and 7F illustrate a case where the light source deviates in the opposite direction similarly to FIGS. 6C and 6F.

Figure 7B:
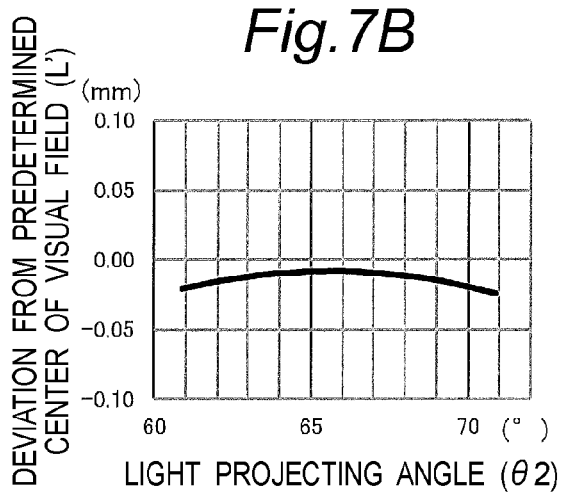
Figure 7E:
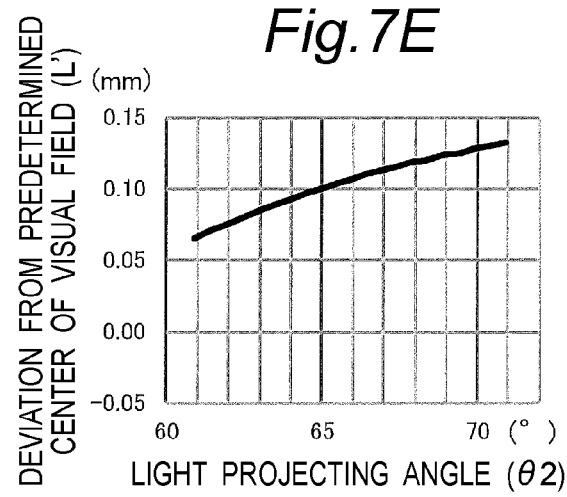
Figure 7C:
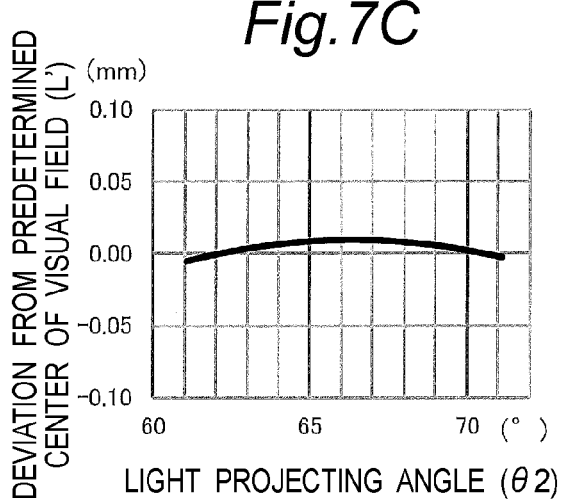

It can be seen from comparison of FIG. 7A with FIGS. 7B and 7C that in the detection device 100 according to the embodiment of the present invention, even if the detection chip is aligned in a state where the light source 121 deviates from the predetermined position, the position deviation L' of the main light beam α' from the predetermined center of the visual field of the detection unit 140 is small. This is because the detection device 100 includes the conjugate optical system 126, and thus, the deviation of the position where the excitation light α hits the detection chip 200 is reduced in such mechanism as illustrated in FIG. 2B, resulting in making small the deviation of the position of the aligned detection chip 200 from the predetermined position of the detection chip 200, the predetermined position being determined in designing. Note that the deviation amounts of the detection chip 200 from the predetermined position are −6 μm and 6 μm in FIGS. 7B and 7C, respectively.

Figure 7F:
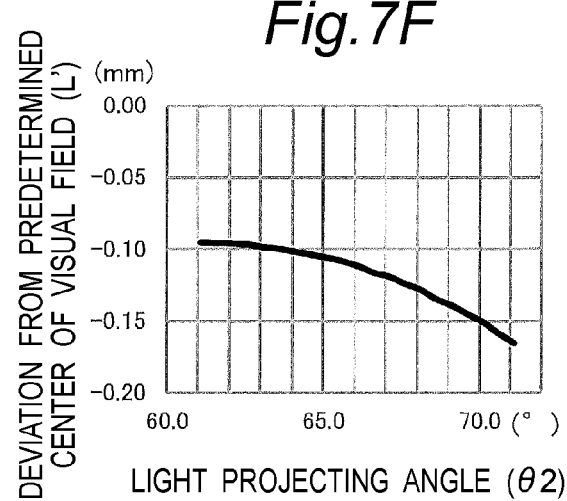

By contrast, it can be seen from comparison of FIG. 7D with FIGS. 7E and 7F that in the detection device 100', when the detection chip is aligned in a state where the light source 121 is deviated from the predetermined position, the deviation L' of the main light beam α' from the predetermined center of the visual field of the detection unit 140 is large. This is because the detection device 100 does not have the conjugate optical system 126, and thus, the deviation of the position where the excitation light α hits the detection chip 200 increases in such mechanism as illustrated in FIG. 2B, resulting in making large the deviation of the position of the aligned detection chip 200 from the predetermined position of the detection chip 200, the predetermined position being determined in designing. Note that the deviation amounts of the detection chip 200 from the predetermined position are 163 μm and −169 μm in FIGS. 7E and 7F, respectively.

As described above, in the detection device 100 according to the embodiment of the present invention, the deviation L' is small from the center of the visual field of the detection unit 140 at the same light projecting angle θ2. Therefore, since a deviation between a spot position on the metal film 31 and the center position of the visual field of the detection unit 140 is small, highly efficient and highly accurate signal measurement can be performed. In addition, a spot of the excitation light α on the metal film 31 is less likely to deviate from a visual field range of the detection unit 140, thereby allowing highly accurate signal measurement to be performed. In addition, the position deviation from the center of the visual field of the detection unit 140 at the time of angle scanning of the light projecting unit 120 is reduced to improve the measurement accuracy of the enhancement angle.

Figure 8A:
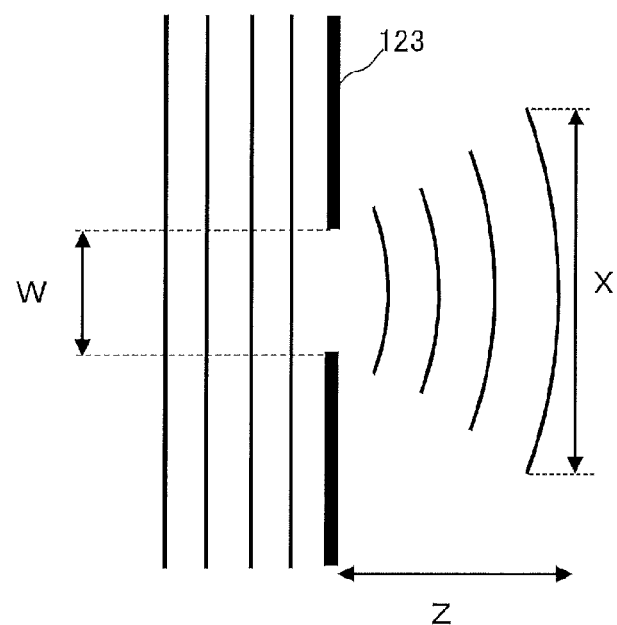
FIG. 8A is a diagram for explaining a relationship among a size W in a minor axis direction of an opening portion in a diaphragm, an optical path length Z from the diaphragm to an irradiation surface of a metal film, a center wavelength A of excitation light, and a spot distribution X.
Figure 8B:
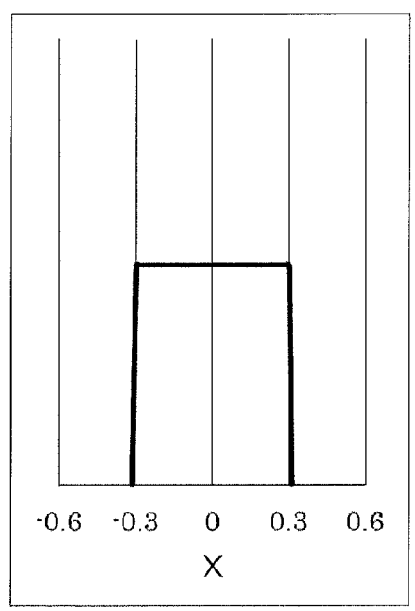
FIGS. 8B and 8C illustrate a case where the opening portion of the diaphragm and a region of the metal film irradiated with the excitation light are optically conjugate and a case where the opening portion and the irradiated region are not optically conjugate, respectively, in a case where $W2/(\lambda \times Z)$ is 19.5 in the detection device.

FIG. 8A illustrates a length W in a minor axis direction of the opening portion in the diaphragm 123, an optical path length Z from the diaphragm 123 to a surface to be irradiated of the metal film 31, and a spread X of the excitation light α. Here, the minor axis direction is defined as a direction along the shortest opening width in the opening size. For example, in a case of a rectangular opening, the minor axis direction is a short side direction of the opening. FIG. 8B illustrates an intensity distribution of light on the metal film 31 in the detection device 100 according to the embodiment of the present invention. The position where X is 0 is a predetermined incident position of an optical axis of the excitation light α. FIG. 8B illustrates a case where W2/(λ×Z) is 19.5 (20 or less) in the detection device 100 according to the embodiment of the present invention. In this case, as illustrated in FIG. 8B, a trail of the spot can be substantially eliminated, so that the spot is less likely to deviate from a specimen supplement region or deviate from a visual field of a light receiving system with respect to a spot position deviation, resulting in enabling robust measurement to be performed. In addition, the light intensity distribution is constant to improve detection accuracy.

Figure 8C:
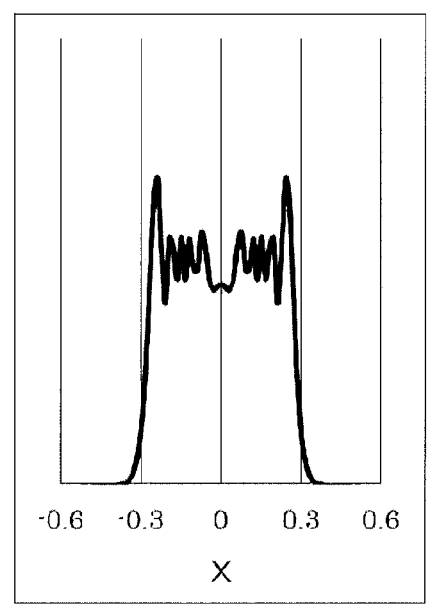

By contrast, FIG. 8C illustrates an intensity distribution of light on the metal film 31 in the detection device 100' for comparison. In the detection device 100' for comparison, when W2/(λ×Z) is set to 19.5 (20 or less), the trail of the spot is wider than the width of the diaphragm 123, so that robust measurement cannot be performed for the spot position deviation, and the intensity distribution of the light varies, resulting in deteriorating the detection accuracy.

According to the detection device 100 according to the embodiment of the present invention, even if the position of the light source 121 deviates, the position where the excitation light α is incident on the metal film 31 is less likely to change. Therefore, the detection device 100 enables light to be accurately incident on the position on the metal film 31 on which a capturing substance is immobilized, and even if the position of the light source 121 is deviated due to heat of the light source 121 or the like during detection of a substance to be measured after scanning the angle of the light projecting unit 120 and determining an enhancement angle, the incident position is less likely to change in the detection device 100 according to the embodiment of the present invention. Therefore, the detection accuracy is improved. In addition, not only in a case where the light source 121 is deviated during measurement but also in a case where the light source is deviated due to a temporal change or the like at the time of starting the measurement, light can be accurately incident on a position on the metal film 31 in the same manner, and the detection accuracy is improved. Furthermore, although in the above, the case where the light source 121 is eccentric has been described as the embodiment, the same effects can be obtained also in a case where the first lens 122 or the optical system of the light projecting unit is eccentric with respect to the light source 121.

The present application claims priority based on Japanese Patent Application No. 2020-058608 filed on Mar. 27, 2020. The contents described in the specification and the drawings of this application are all incorporated herein by reference.

The detection device according to the present invention can more accurately determine an enhancement angle and improve detection accuracy of a substance to be detected, and thus is useful for, for example, clinical examination and the like.

The invention claimed is:

1. A detection device that detects presence or an amount of a substance to be detected using an enhanced electric field based on surface plasmon resonance, the detection device comprising:
a chip holder configured to hold a detection chip having a metal film and a capturing body for capturing a substance to be detected which is immobilized on the metal film;
a light projecting unit configured to irradiate the metal film of the detection chip held by the chip holder with excitation light to generate the surface plasmon resonance; and
a detection unit configured to detect light that is derived from the presence or the amount of the substance to be detected, and is generated by occurrence of the surface plasmon resonance as a result of irradiation of the metal film with the excitation light, wherein
the light projecting unit includes:
a light source that emits the excitation light;
a diaphragm for regulating a light flux emitted from the light source; and
a conjugate optical system that optically conjugates an opening portion of the diaphragm and a region of the metal film irradiated with the excitation light, and
the light projecting unit further includes a lens that is disposed between the light source and the diaphragm and that makes light emitted from the light source be collimated light toward the diaphragm.

2. The detection device according to claim 1, further comprising a light projecting unit angle adjustment unit configured to drive an angle of the light projecting unit to change an incident angle of the excitation light onto the metal film.

3. The detection device according to claim 1, wherein the conjugate optical system is a reduction optical system that converts a light flux diameter such that a beam size of the excitation light emitted from the light projecting unit is smaller than an opening size of the opening portion.

4. The detection device according to claim 1, wherein an irradiation spot size of the excitation light on the metal film is smaller than a size of a region where the capturing body is immobilized on the metal film.

5. The detection device according to claim 1, wherein an irradiation spot size of the excitation light on the metal film is smaller than a visual field size of the detection unit.

6. The detection device according to claim 1, wherein when a length in a minor axis direction of the opening portion is represented as W, an optical path length from the opening portion to the metal film as Z, and a wavelength of the excitation light as λ, W2/(λ×Z) is 20 or less.

7. The detection device according to claim 1, wherein a shape of the opening portion is oval or rectangular.

8. The detection device according to claim 1, comprising:
a reflection member configured to cause a part of the excitation light having passed through the diaphragm to be reflected;
a reflected light detection unit configured to detect the excitation light reflected by the reflection member; and
a feedback control unit configured to adjust an output of the light source according to a light amount detected by the reflected light detection unit.

9. A detection device that detects presence or an amount of a substance to be detected using an enhanced electric field based on surface plasmon resonance, the detection device comprising:
a chip optical signal detection unit configured to detect reflected light or transmitted light generated in the detection chip held by the chip holder when the detection chip is irradiated with the excitation light;
a chip position detection unit configured to detect a position of the detection chip according to an output value of the chip optical signal detection unit;
a detected chip position adjustment unit configured to move the detection chip to a measurement position on the basis of a detection chip position detected by the chip position detection unit;

a chip holder configured to hold a detection chip having a metal film and a capturing body for capturing a substance to be detected which is immobilized on the metal film;

a light projecting unit configured to irradiate the metal film of the detection chip held by the chip holder with excitation light to generate the surface plasmon resonance; and a detection unit configured to detect light that is derived from the presence or the amount of the substance to be detected, and is generated by occurrence of the surface plasmon resonance as a result of irradiation of the metal film with the excitation light, wherein the light projecting unit includes:
  a light source that emits the excitation light;
  a diaphragm for regulating a light flux emitted from the light source; and
  a conjugate optical system that optically conjugates an opening portion of the diaphragm and a region of the metal film irradiated with the excitation light.

10. A detection method for detecting presence or an amount of a substance to be detected using an enhanced electric field based on surface plasmon resonance, the detection method comprising:

preparing a detection device, the detection device including:
  a chip holder configured to hold a detection chip having a metal film and a capturing body for capturing a substance to be detected which is immobilized on the metal film;
  a light projecting unit configured to irradiate the metal film of the detection chip held by the chip holder with excitation light to generate the surface plasmon resonance;
  a detection unit configured to detect light that is derived from the presence or the amount of the substance to be detected, and is generated by occurrence of the surface plasmon resonance as a result of irradiation of the metal film with the excitation light;
  a chip optical signal detection unit configured to detect reflected light or transmitted light generated in the detection chip held by the chip holder when the detection chip is irradiated with the excitation light;
  a chip position detection unit configured to detect a position of the detection chip according to an output value of the chip optical signal detection unit; and
  a detected chip position adjustment unit configured to move the detection chip to a measurement position on the basis of a detection chip position detected by the chip position detection unit, wherein the light projecting unit includes:
  a light source that emits the excitation light;
  a diaphragm for regulating a light flux emitted from the light source; and
  a conjugate optical system that optically conjugates an opening portion of the diaphragm and a region of the metal film irradiated with the excitation light, detecting reflected light or transmitted light of the excitation light with which the detection chip held by the chip holder is irradiated to obtain position information of the detection chip; and adjusting a position of the detection chip on the basis of the position information of the detection chip.

* * * * *